US011221237B2

(12) United States Patent
Park

(10) Patent No.: US 11,221,237 B2
(45) Date of Patent: Jan. 11, 2022

(54) ZERO-FORCE EQUALIZED VECTOR SYNTHESIS ABSOLUTE ENCODER METHOD AND APPARATUS

(71) Applicant: Chun Soo Park, Seoul (KR)

(72) Inventor: Chun Soo Park, Seoul (KR)

(*) Notice: Subject to any disclaimer, the term of this patent is extended or adjusted under 35 U.S.C. 154(b) by 0 days.

(21) Appl. No.: 16/766,275

(22) PCT Filed: Sep. 16, 2019

(86) PCT No.: PCT/KR2019/011948
§ 371 (c)(1),
(2) Date: May 21, 2020

(87) PCT Pub. No.: WO2020/149489
PCT Pub. Date: Jul. 23, 2020

(65) Prior Publication Data
US 2021/0356299 A1 Nov. 18, 2021

(30) Foreign Application Priority Data

Jan. 14, 2019 (KR) .......... 10-2019-0004810
Aug. 16, 2019 (KR) .......... 10-2019-0100588

(51) Int. Cl.
G01D 5/244 (2006.01)
G01D 5/14 (2006.01)

(52) U.S. Cl.
CPC ......... G01D 5/24476 (2013.01); G01D 5/142 (2013.01)

(58) Field of Classification Search
CPC ..... G01D 5/244; G01D 5/24476; G01D 5/142
See application file for complete search history.

(56) References Cited

U.S. PATENT DOCUMENTS 6,181,714 B1 * 1/2001 Isaksson ............. H04L 27/2614
370/491
6,363,128 B1 * 3/2002 Isaksson ............. H04L 27/2656
375/355

(Continued)

FOREIGN PATENT DOCUMENTS

FR 2866770 A1 * 8/2005 .......... H04L 25/067
JP 2008-151774 7/2008

(Continued)

OTHER PUBLICATIONS

Authors: Mark Lacroix, A John Santos, and Dr. Lei Wang Title: High Resolution Hall effect encoders provide high accuracy signals in harsh environments including the presence of high external magnetic fields. Presentation: Jan. 30, 2014, Orlando, FL, USA. Total 26 pages. Retrieved from the internet May 29, 2020 at: http://www.timkenencoders.com/Content/uploads/Timken-MD-Offset-and-Strength-Comparison-Paper-1192-2154.pdf.

(Continued)

Primary Examiner — Tung S Lau
(74) Attorney, Agent, or Firm — LRK Patent Law Firm

(57) ABSTRACT

In an absolute encoder, a system of linear equations is built based on the mathematical analysis that each phase-delayed displacement signal from a plurality of position sensors placed at certain electrical phase angle positions in a 360° electrical cycle contains a component of its two orthogonal displacement signals, sin(θ) and cos(θ). The two orthogonal displacement signals are optimally obtained by solving the system of linear equations based on the principle that the sum of all other tap's signals other than own tap's signal is forced to be zero at each tap, which is essentially applying the zero-force (ZF) equalization to the phase-delayed sinusoidal or square wave displacement signals of position sensors. By applying the ZF equalization to distortion-prone raw signals of a plurality of position sensors, signal com- (Continued)

ponents, other than the two orthogonal displacement signals, are eliminated and distortion-minimized optimal two orthogonal displacement signals are synthesized.

14 Claims, 21 Drawing Sheets

(56) References Cited

U.S. PATENT DOCUMENTS

| | | | | |
|---|---|---|---|---|
| 6,438,174 | B1* | 8/2002 | Isaksson | H04L 5/006 375/261 |
| 6,963,532 | B1* | 11/2005 | Dent | H04B 1/707 370/208 |
| 7,092,450 | B1* | 8/2006 | Al-Dhahir | H04B 7/0845 375/267 |
| 7,180,969 | B1* | 2/2007 | Erving | H04L 1/0057 375/232 |
| 7,292,647 | B1* | 11/2007 | Giannakis | H04L 1/0041 375/295 |
| 7,502,425 | B2* | 3/2009 | Erving | H04L 1/0057 375/232 |
| 7,869,497 | B2* | 1/2011 | Benvenuto | H04L 25/03159 375/233 |
| 7,974,358 | B2* | 7/2011 | Tsai | H04L 27/2647 375/262 |
| 7,999,533 | B2 | 8/2011 | LaCroix | |
| 8,385,387 | B2* | 2/2013 | Nervig | H04L 27/2647 375/147 |
| 10,608,850 | B2* | 3/2020 | Hormati | H04L 25/03057 |
| 10,992,507 | B2* | 4/2021 | Walk | H04L 27/2649 |
| 2002/0126768 | A1* | 9/2002 | Isaksson | H04L 27/3461 375/298 |
| 2011/0286497 | A1* | 11/2011 | Nervig | H04L 25/03159 375/147 |
| 2015/0333940 | A1* | 11/2015 | Shokrollahi | H04L 25/4917 375/296 |
| 2020/0235963 | A1* | 7/2020 | Hormati | H04L 25/49 |

FOREIGN PATENT DOCUMENTS

| | | |
|---|---|---|
| JP | 2009-522567 | 6/2009 |
| JP | 2009-210315 | 9/2009 |
| JP | 2010-139405 | 6/2010 |
| JP | 2014-178310 | 9/2014 |
| KR | 101749522 | 6/2017 |
| KR | 10-2017-0125723 | 11/2017 |

OTHER PUBLICATIONS

EE4601, Communications Systems Lecture, Week 13, 2010, Georgia Institute of Technology, Title: Linear Zero Forcing Equalization Total 14 pages. Retrieved from the internet May 29, 2020 at: http://wireless-systems.ece.gatech.edu/4601/lectures-2012/week13.pdf.

"Zero Forcing Equalizer", Wikipedia. Total 1 page. Retrieved from the internet May 29, 2020 at: https://en.wikipedia.org/wiki/Zero_forcing_equalizer.

Written Opinion of the International Searching Authority for related International Application PCT/KR2019/011948 (dated Dec. 26, 2019) (Together with English translation, Total 18 pages).

* cited by examiner

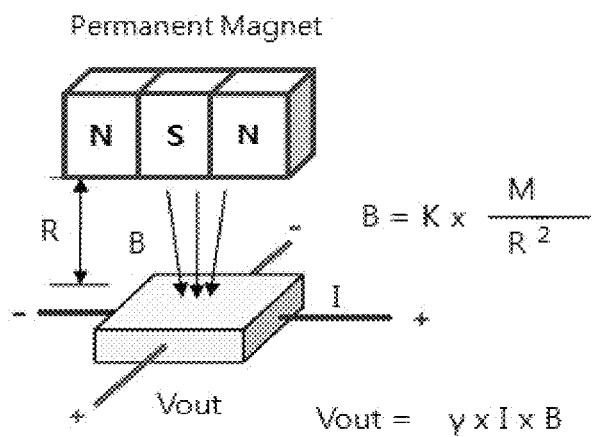
B : Magnetic Flux Passing Through the Hall Sensor
K : Permeability
M : Magnetic Field Strength
R : Distance Between the Hall Sensor and Magnet
γ : Hall Constant
I : Current Flowing on Hall Sensor
Vout : Hall Sensor Output Voltage
FIG. 1-a
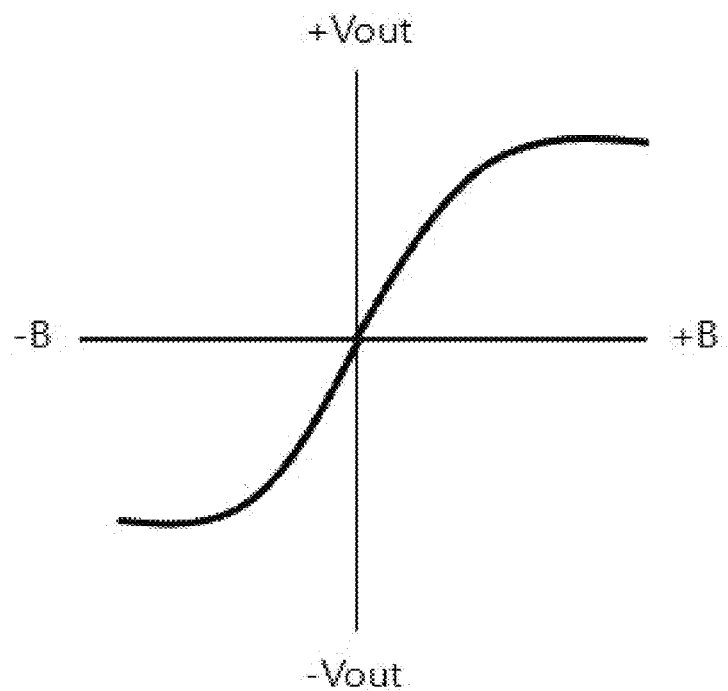
FIG. 1-b

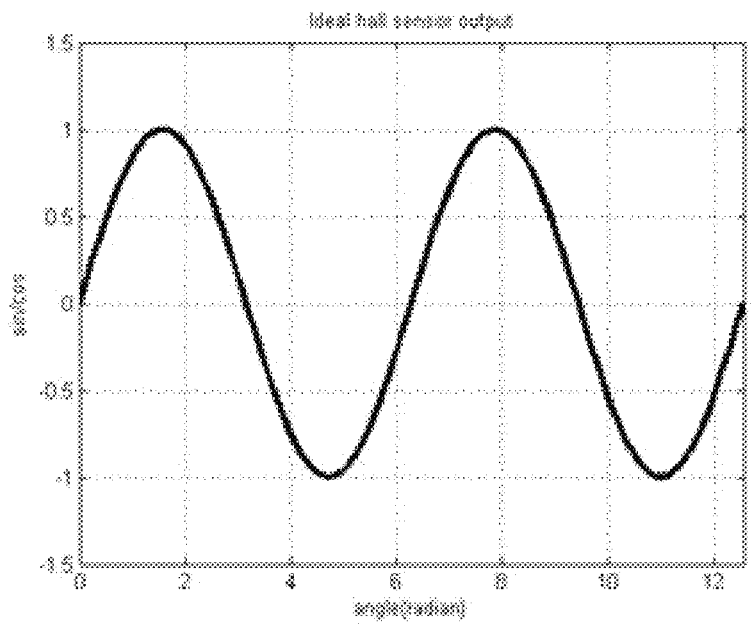
FIG. 2-a
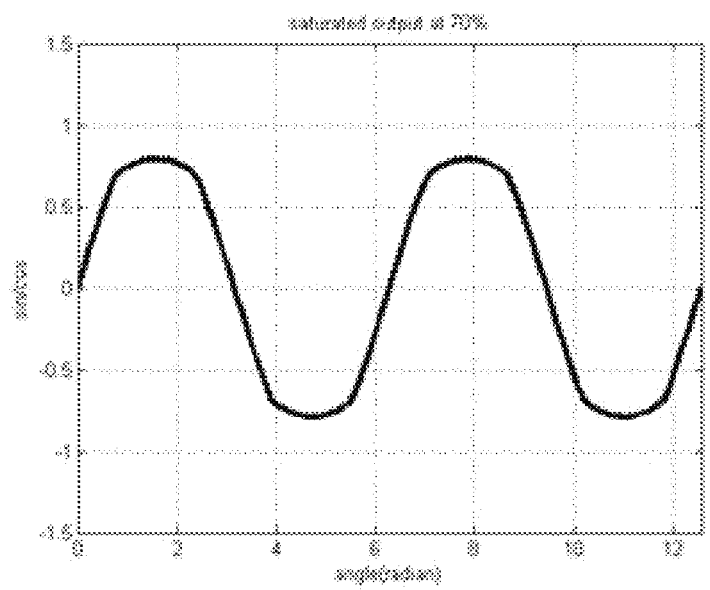
FIG. 2-b

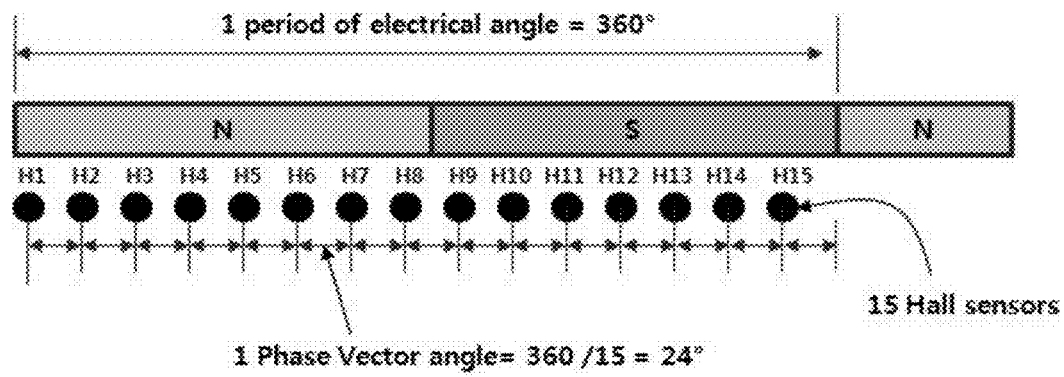
FIG. 4-a
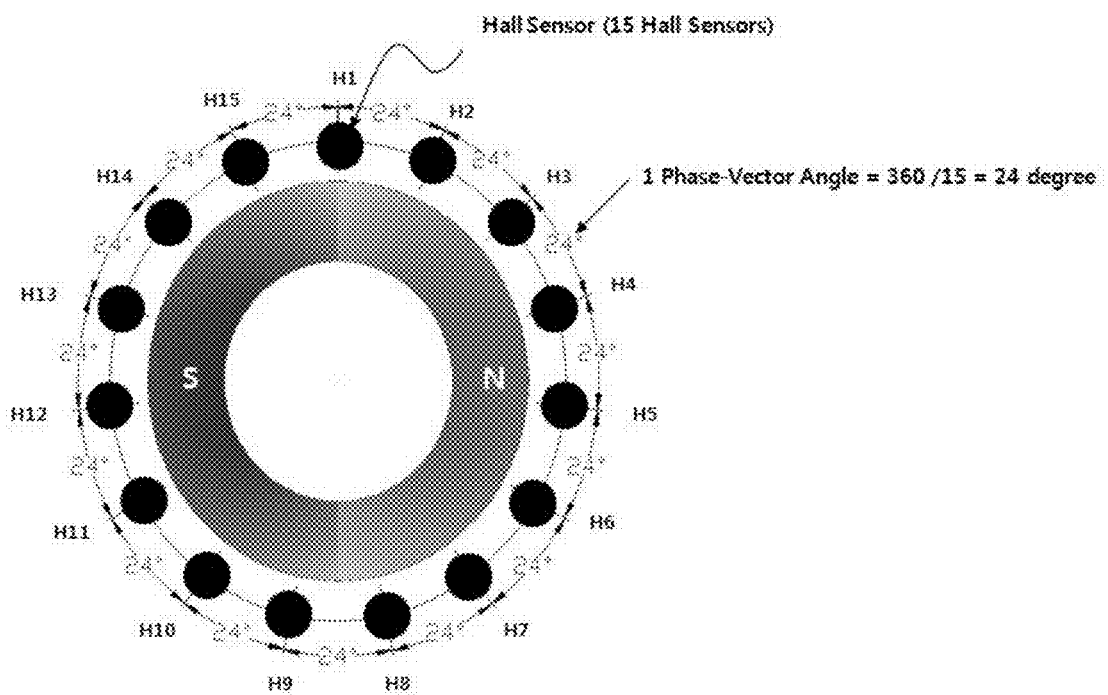
FIG. 4-b

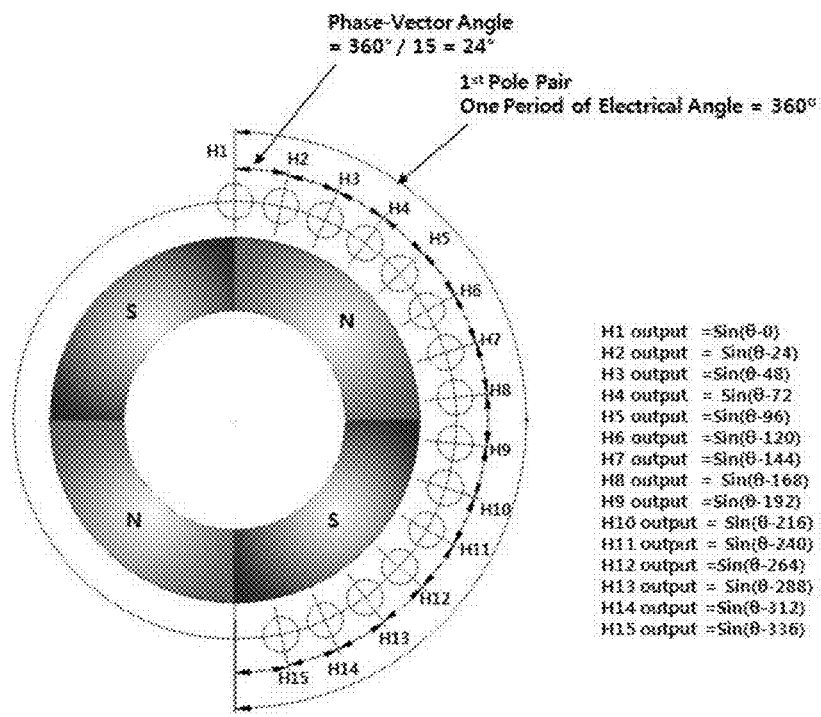
FIG. 4-c
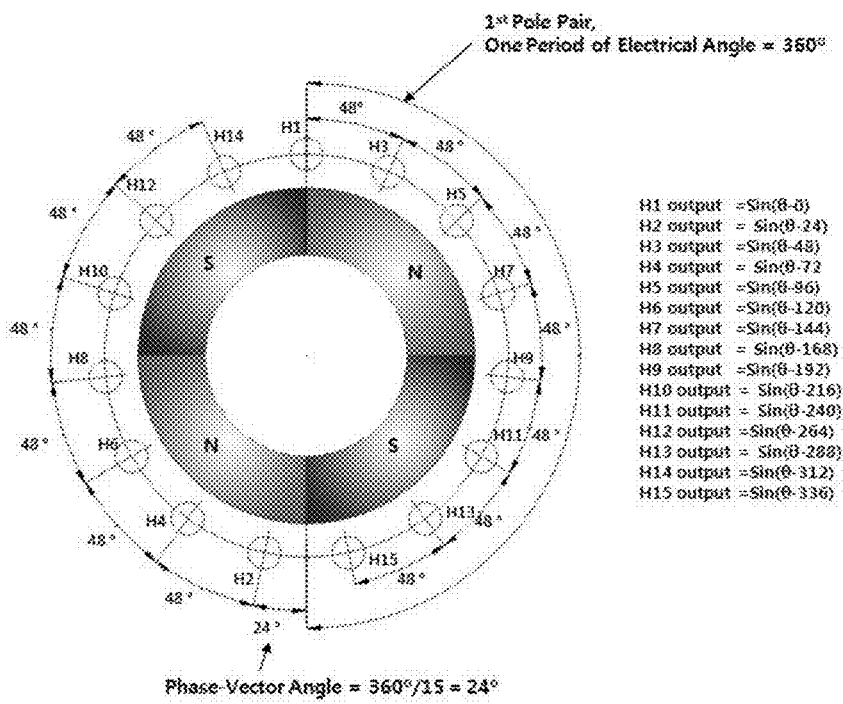
FIG. 4-d

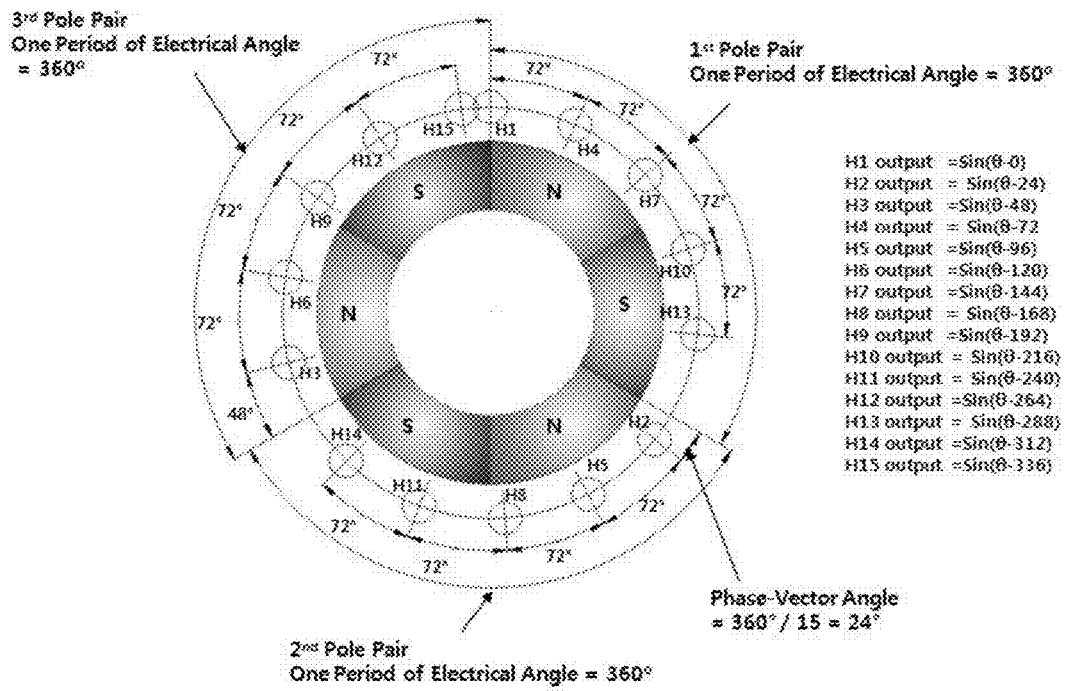
FIG. 4-e
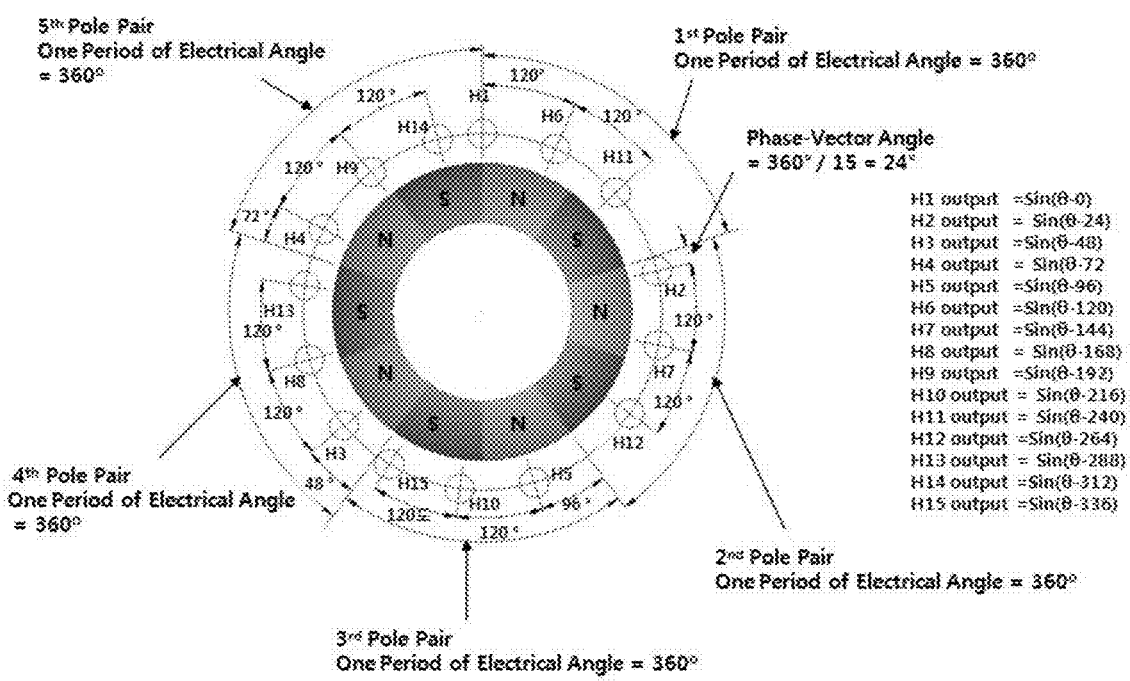
FIG. 4-f

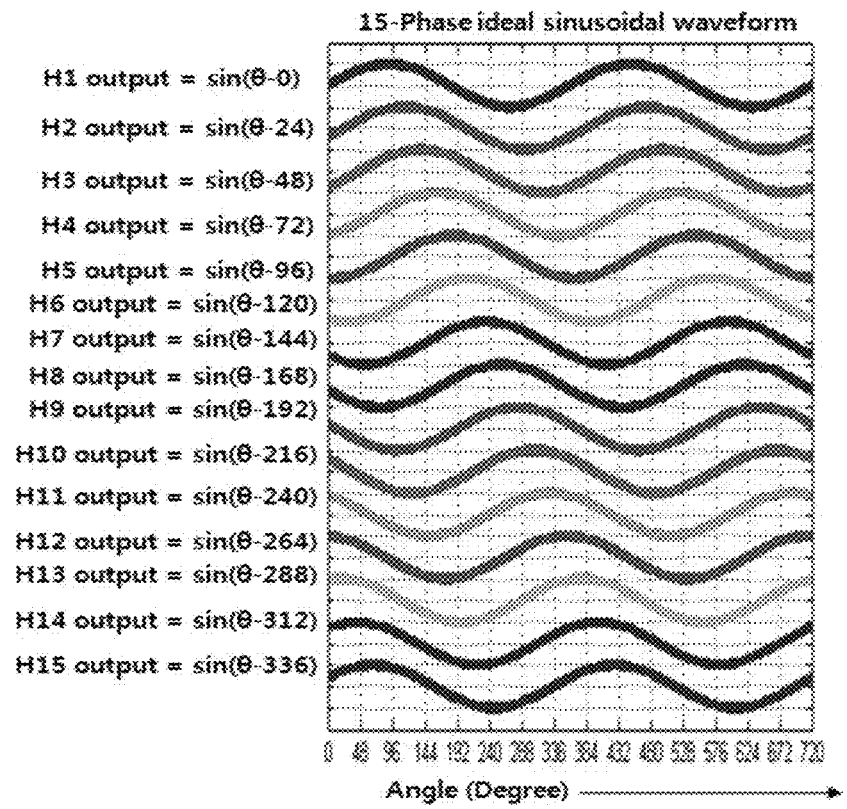
FIG. 5-a
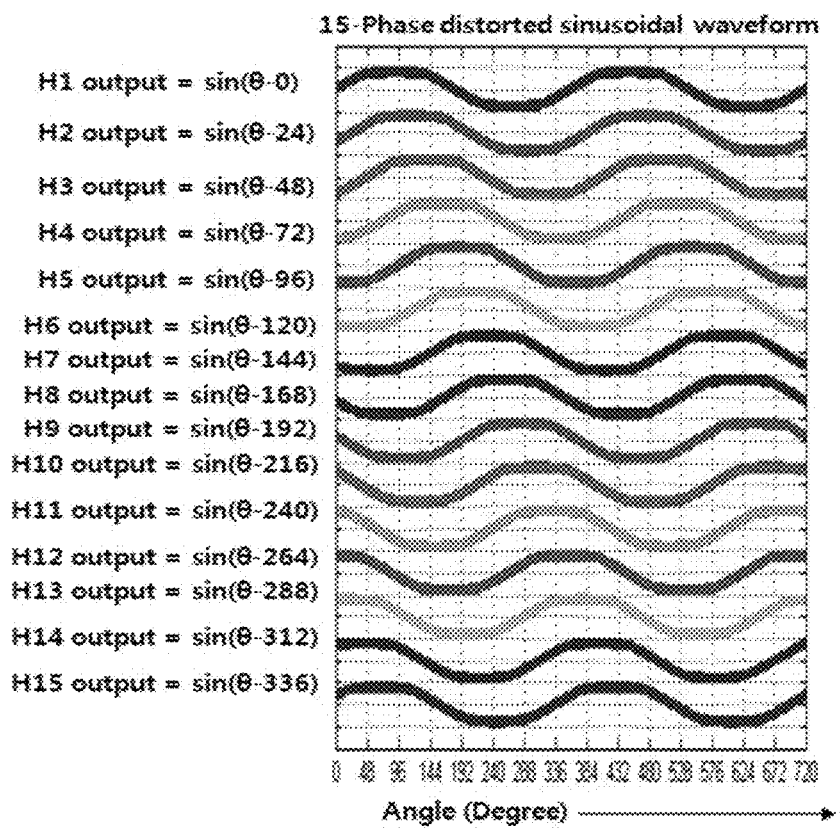
FIG. 5-b

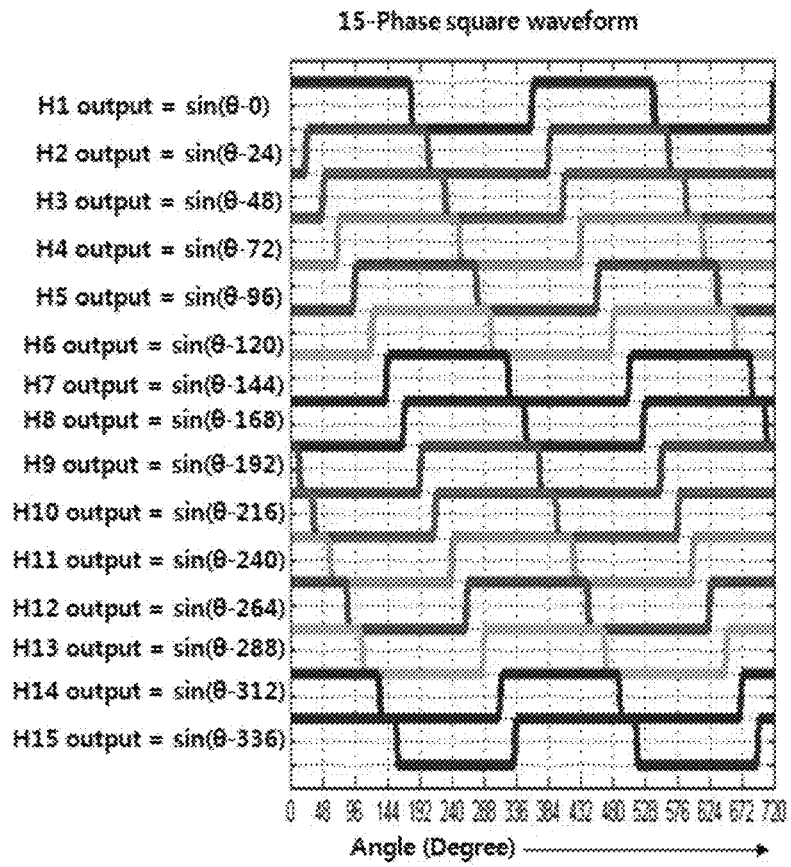
FIG. 5-c
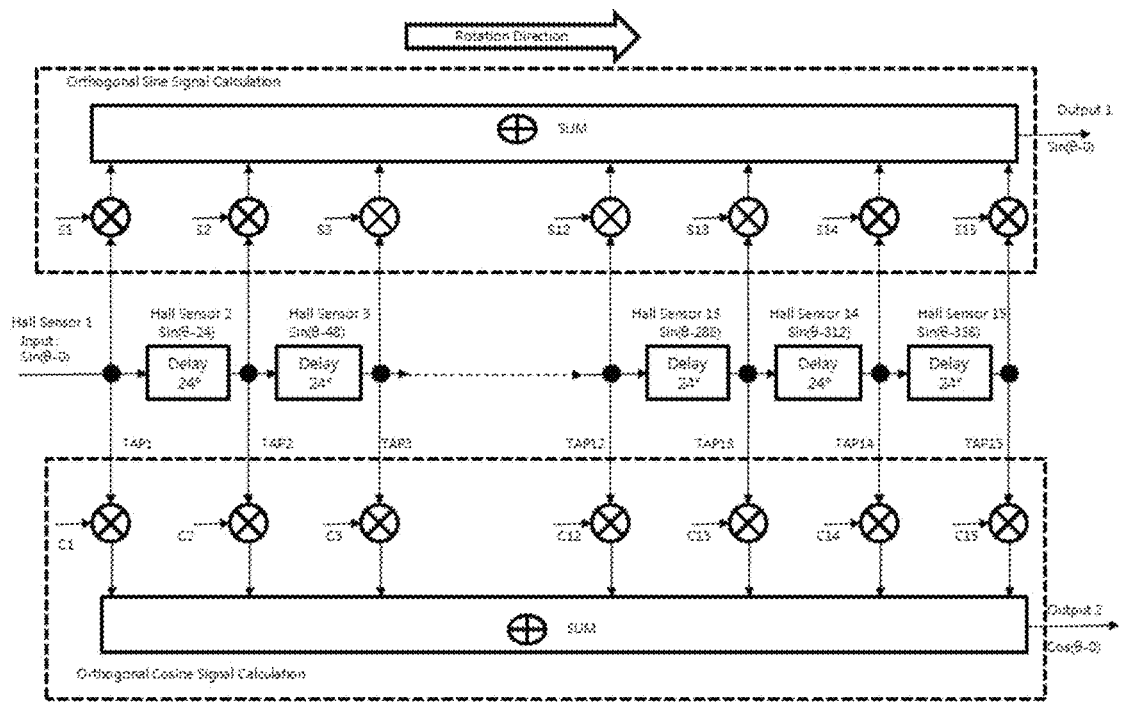
FIG. 6

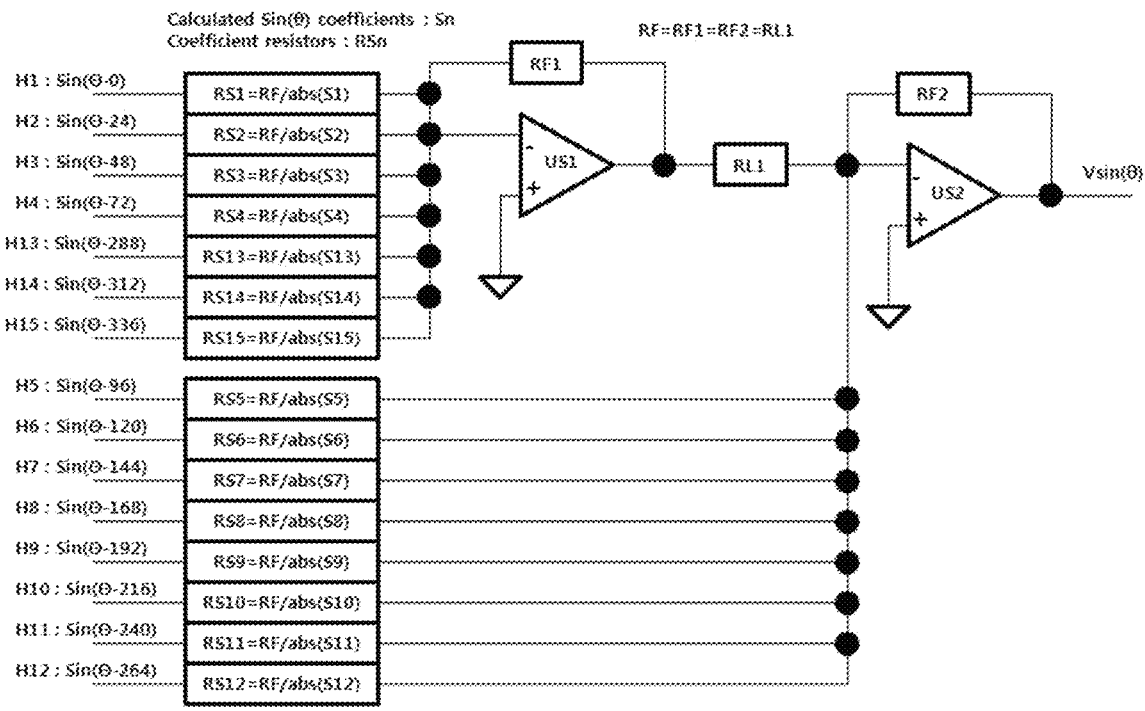
FIG. 7-a
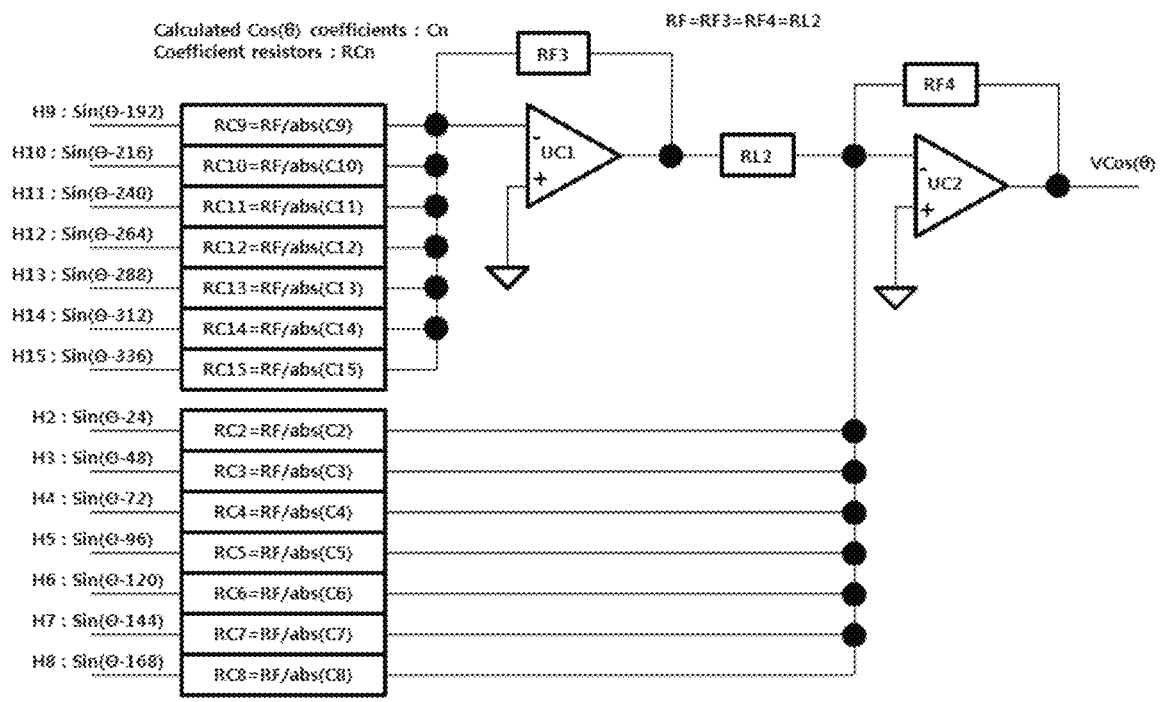
FIG. 7-b

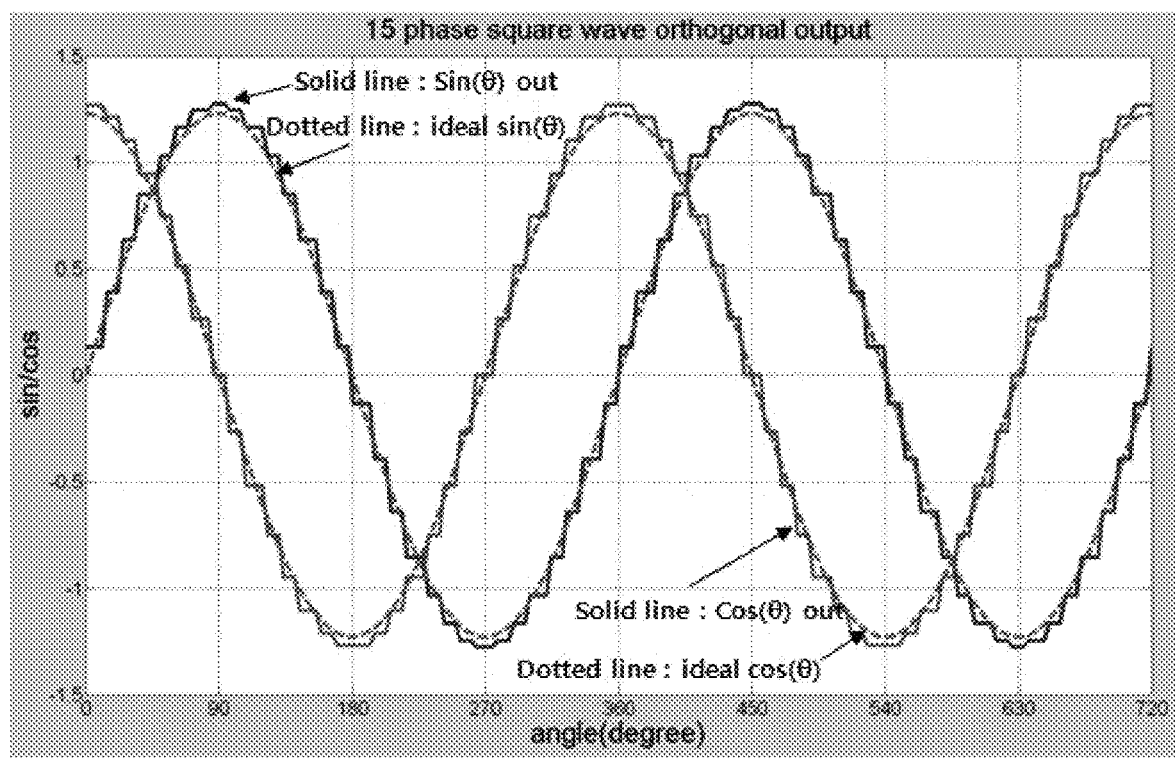
FIG. 8-a
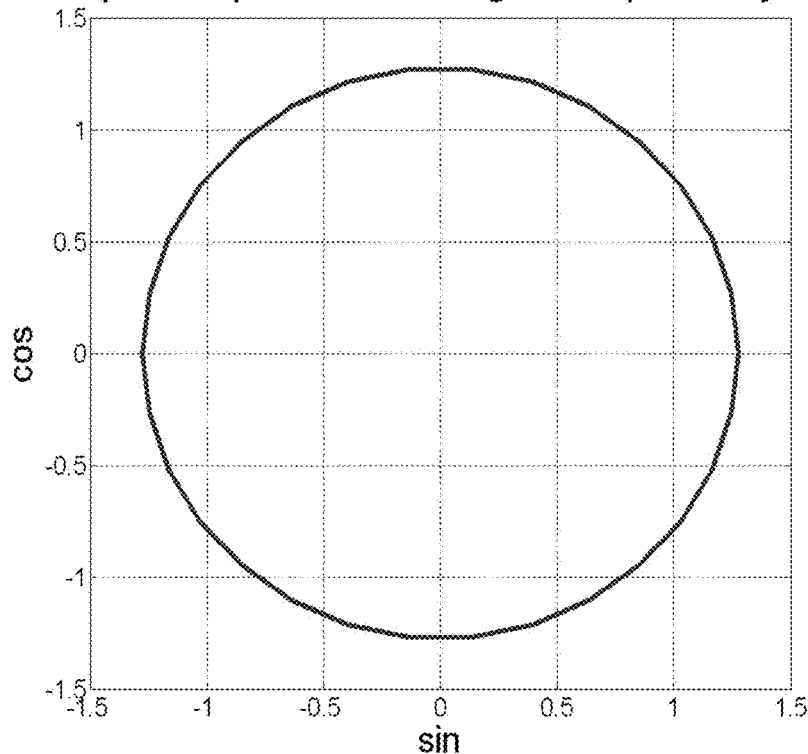
FIG. 8-b

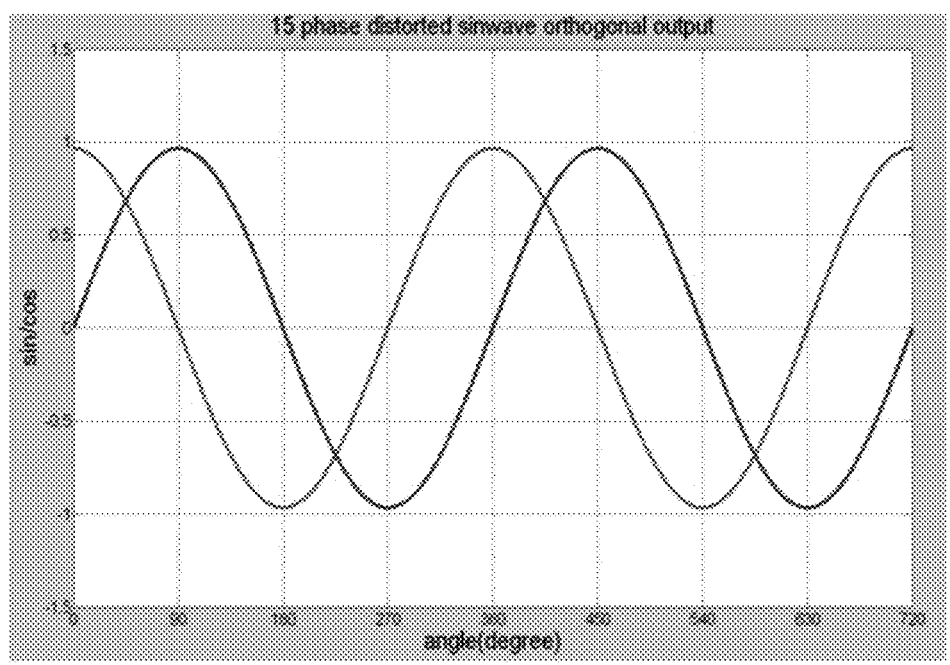
FIG. 9-a
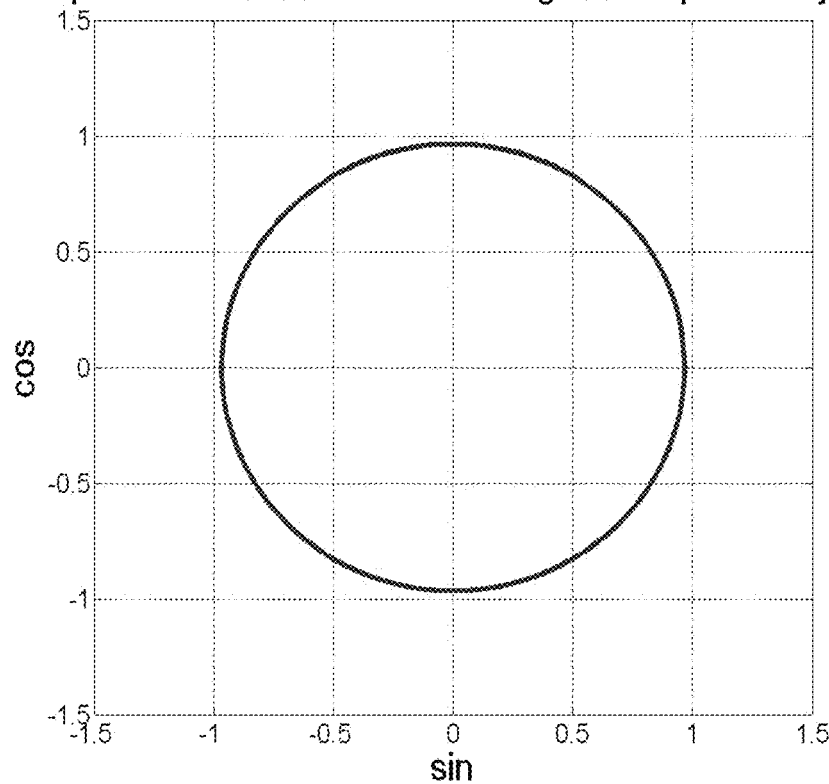
FIG. 9-b

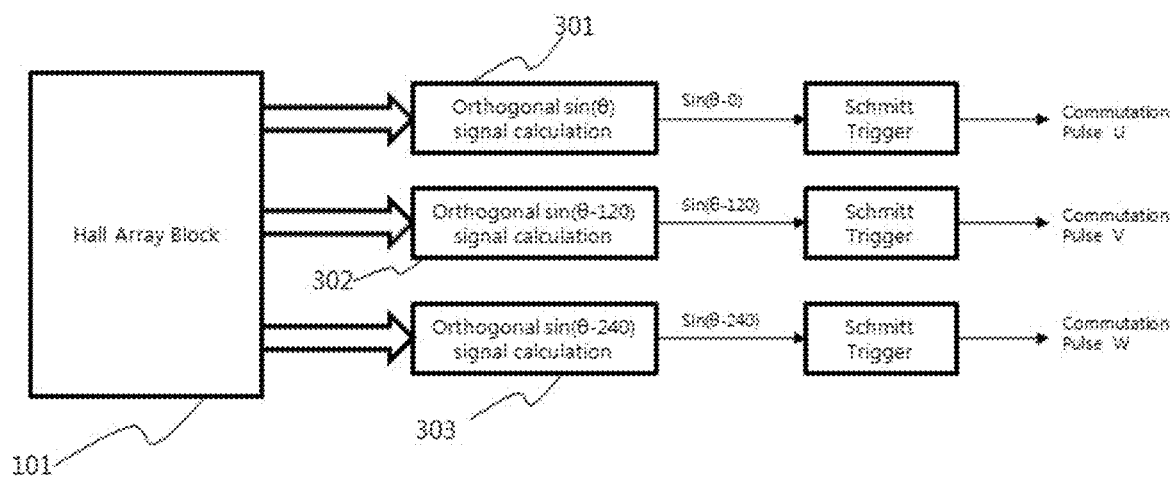
FIG. 12
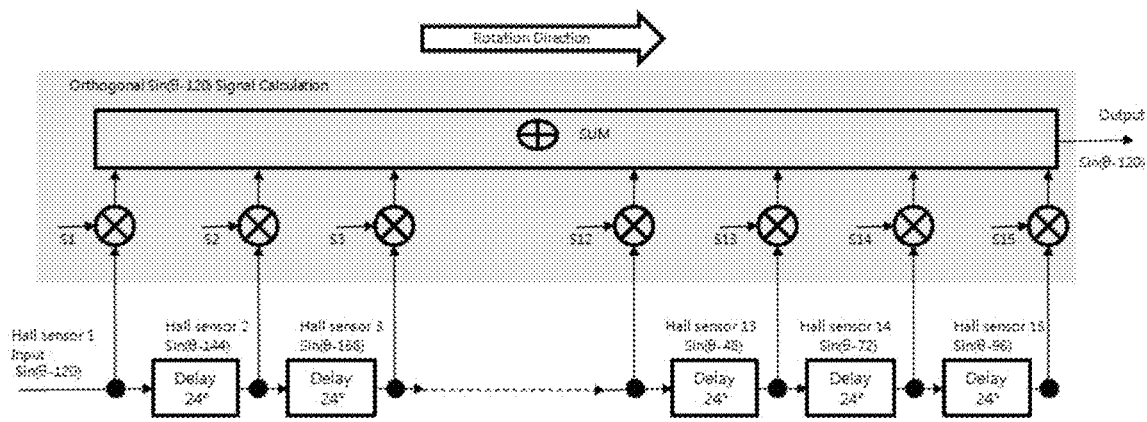
FIG. 13-a
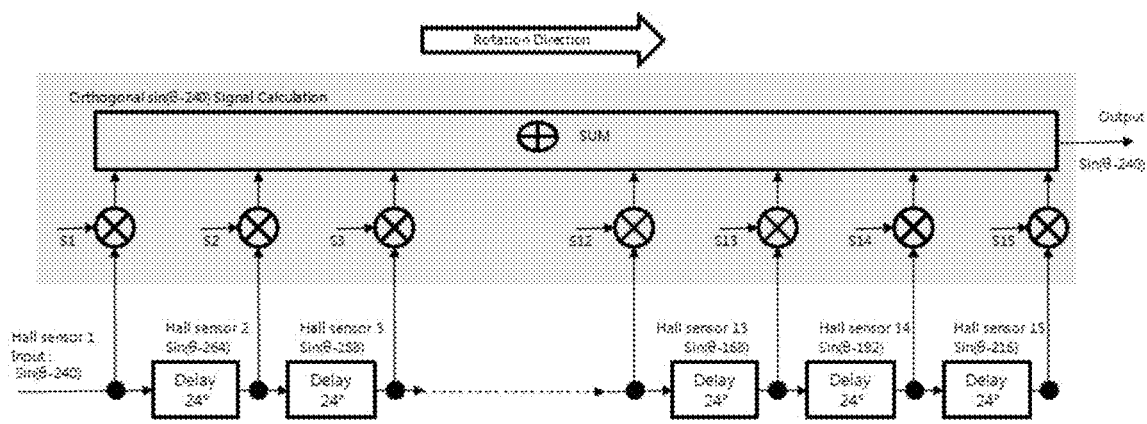
FIG. 13-b

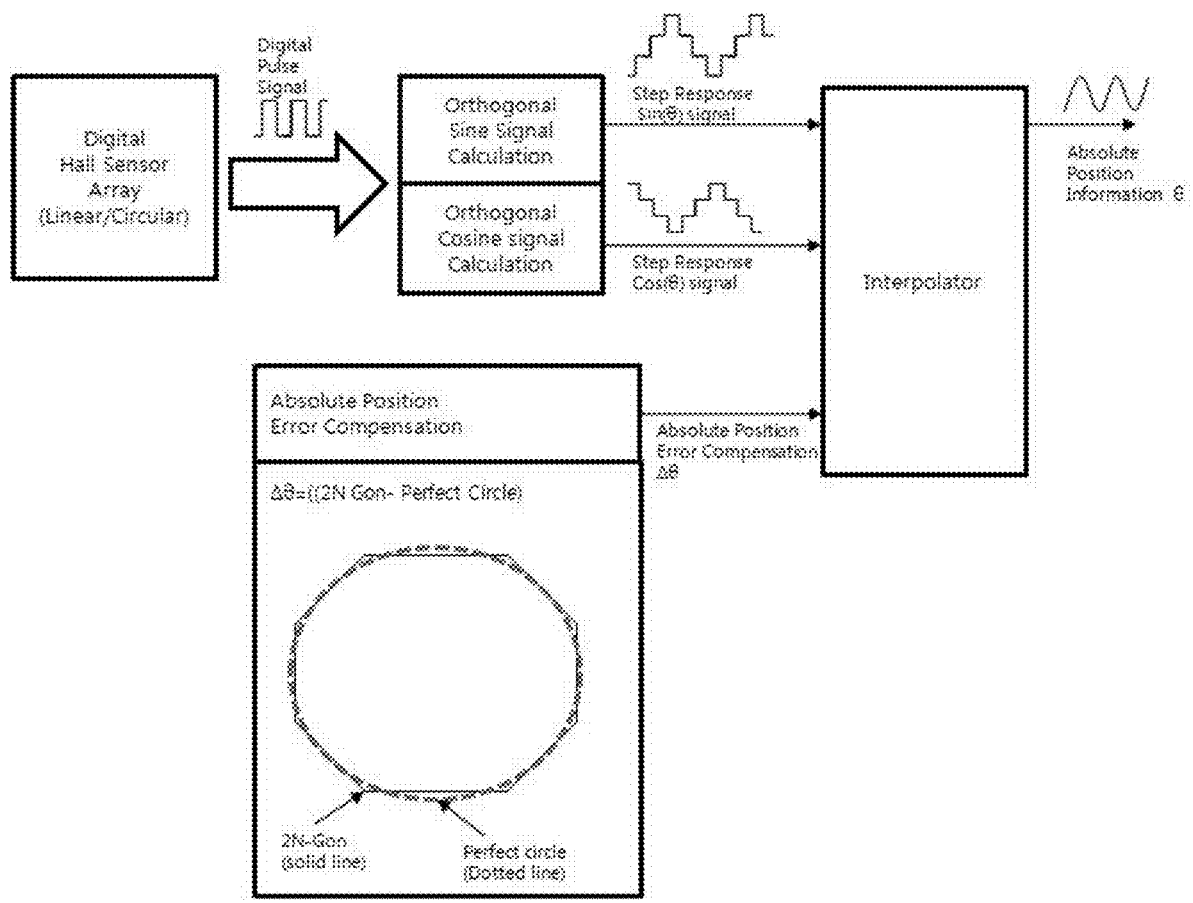
FIG. 13-c
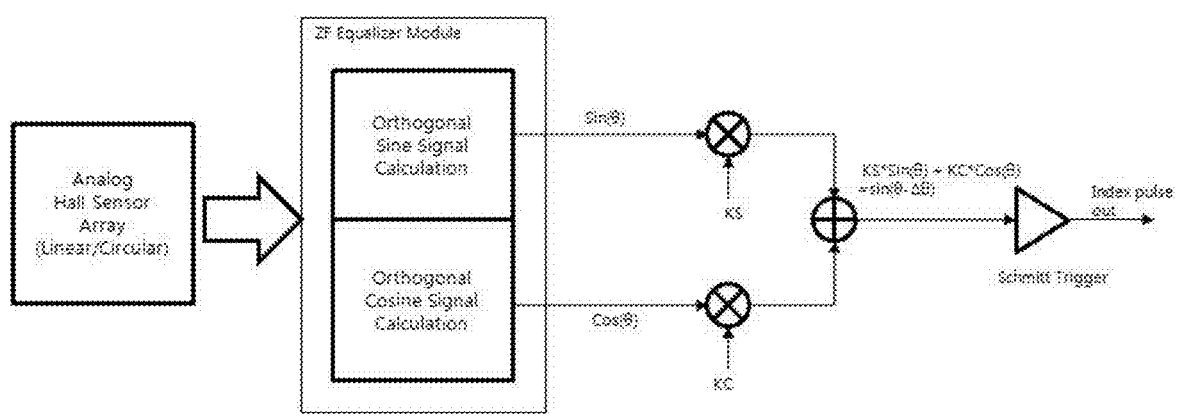
FIG. 13-d

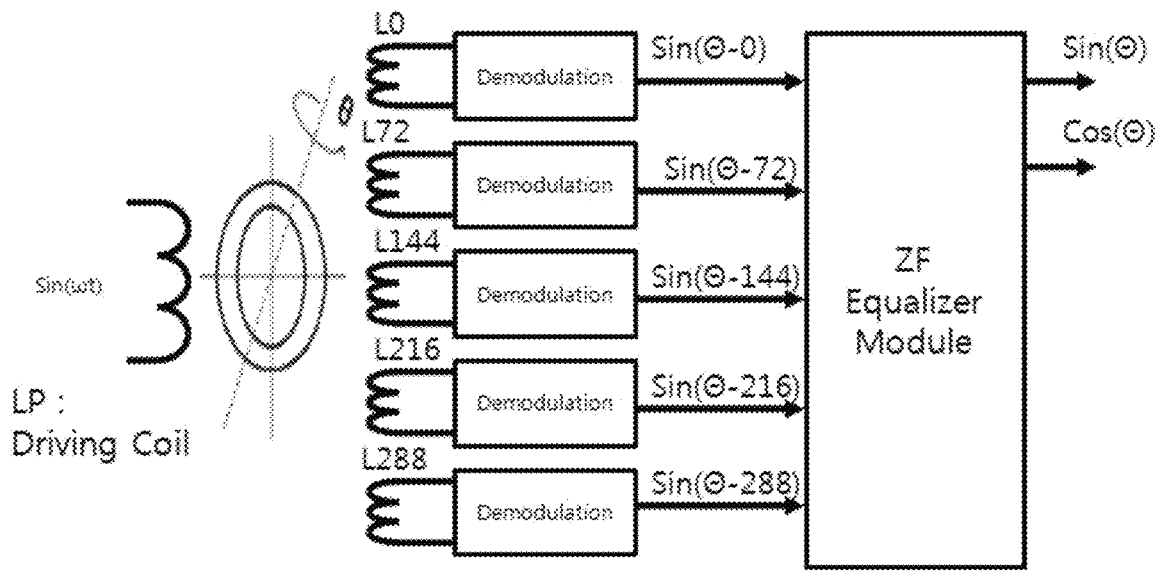
FIG. 13-e
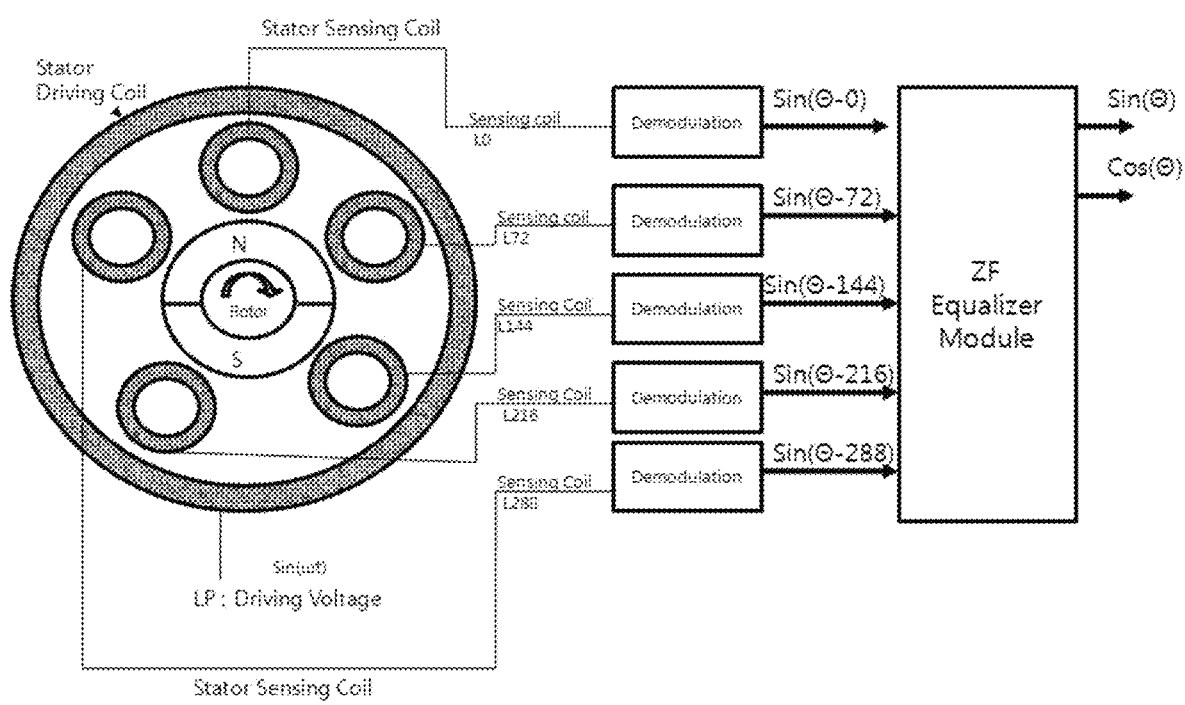
FIG. 13-f

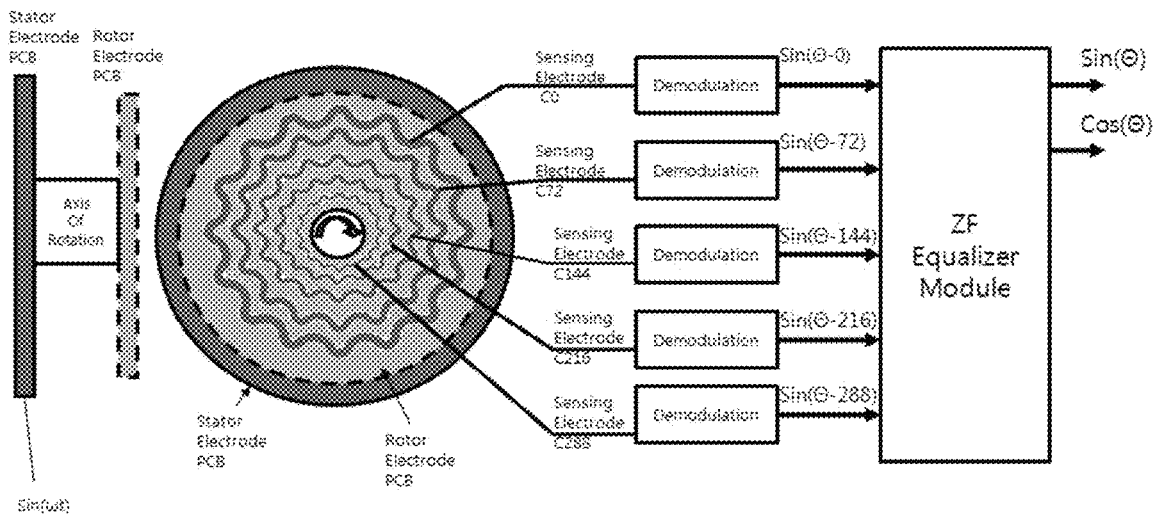
FIG. 13-g
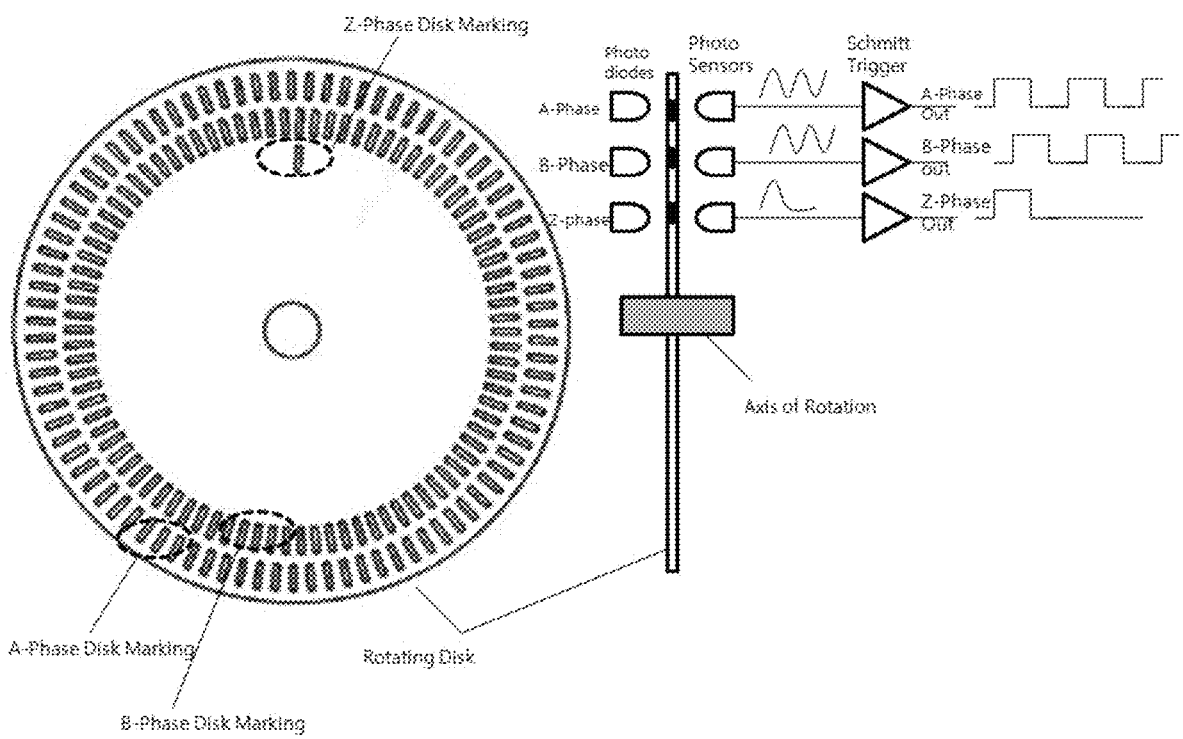
FIG. 14-a

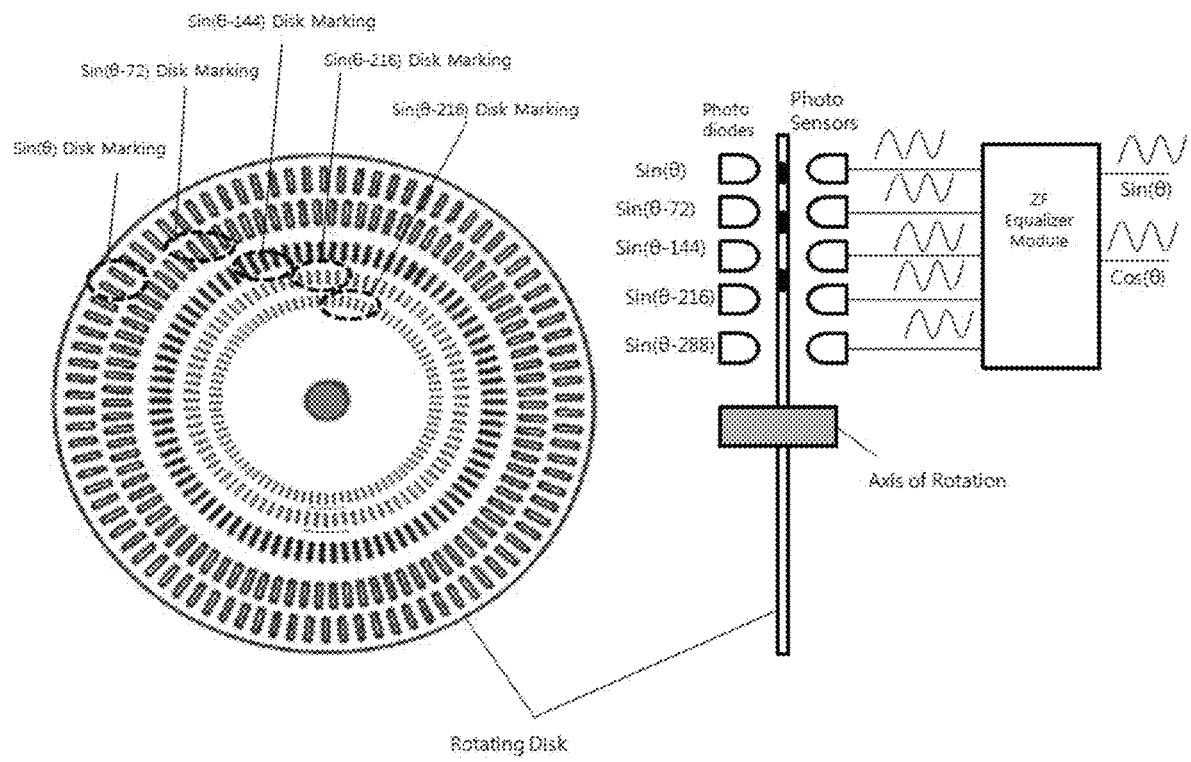
FIG. 14-b
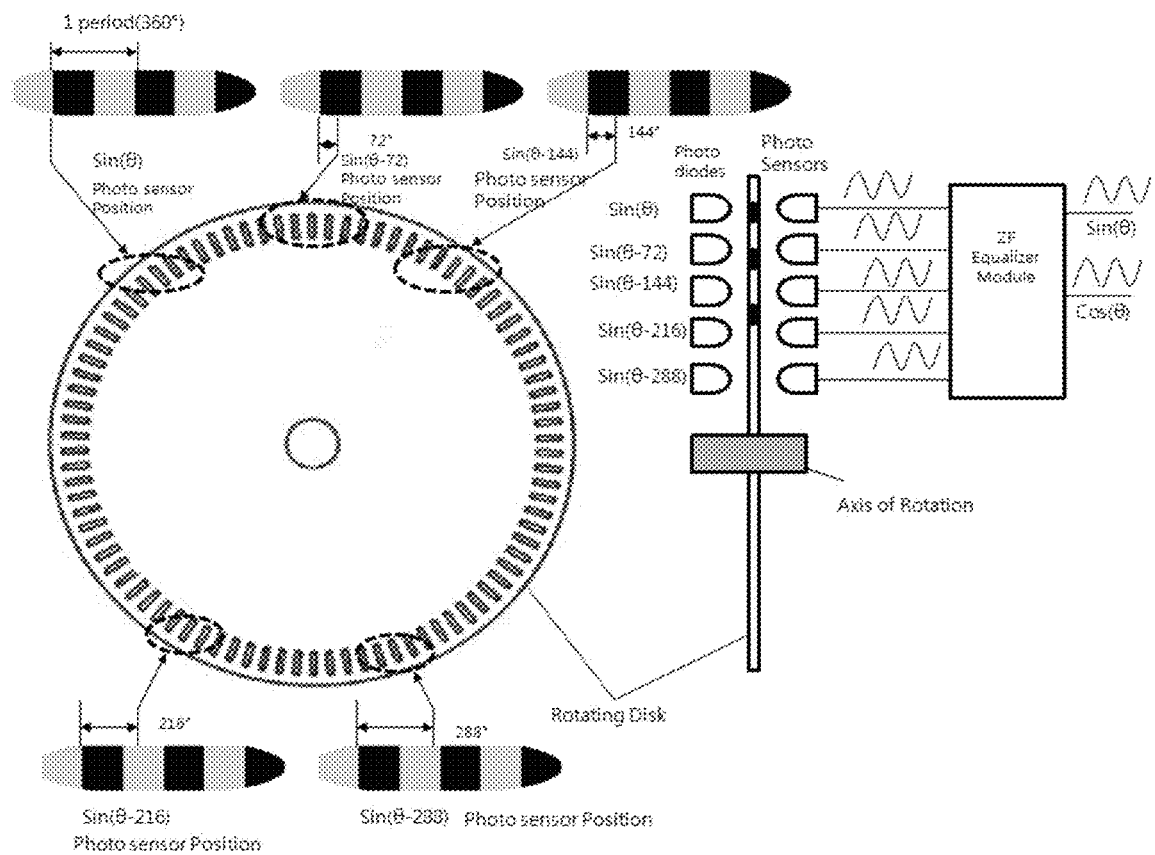
FIG. 14-c

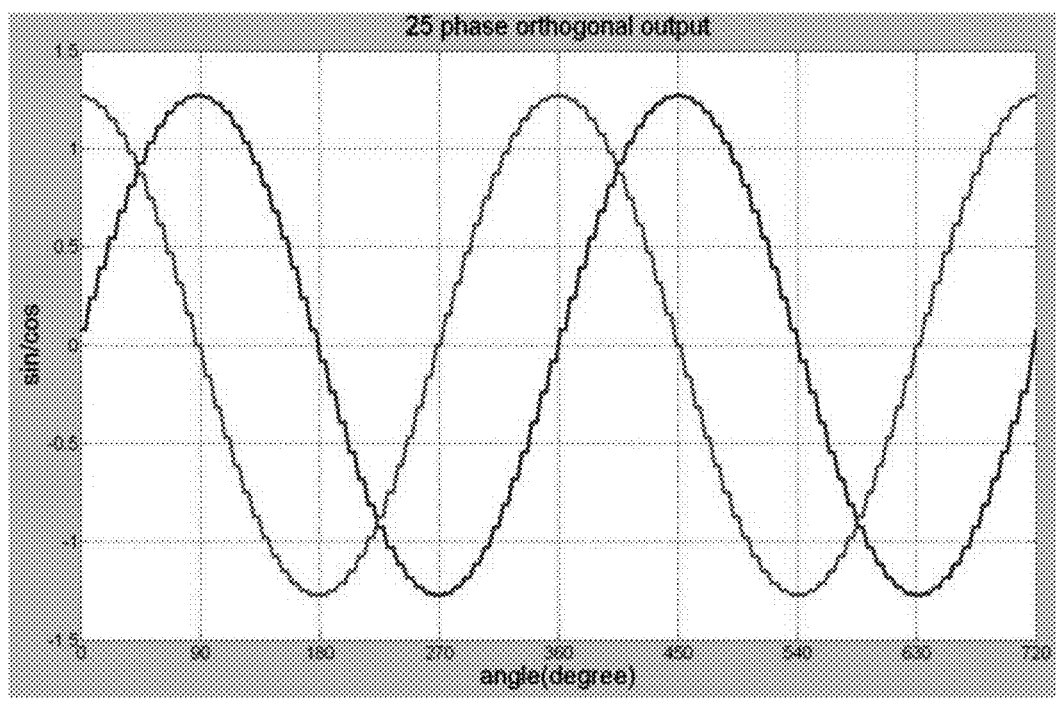
FIG. 15-a
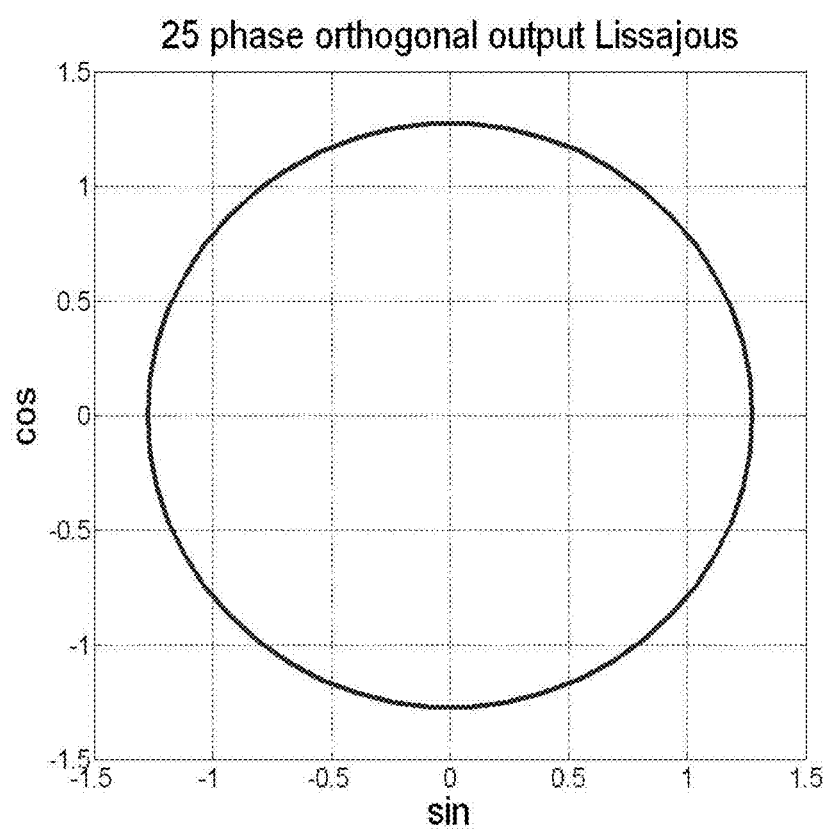
FIG. 15-b

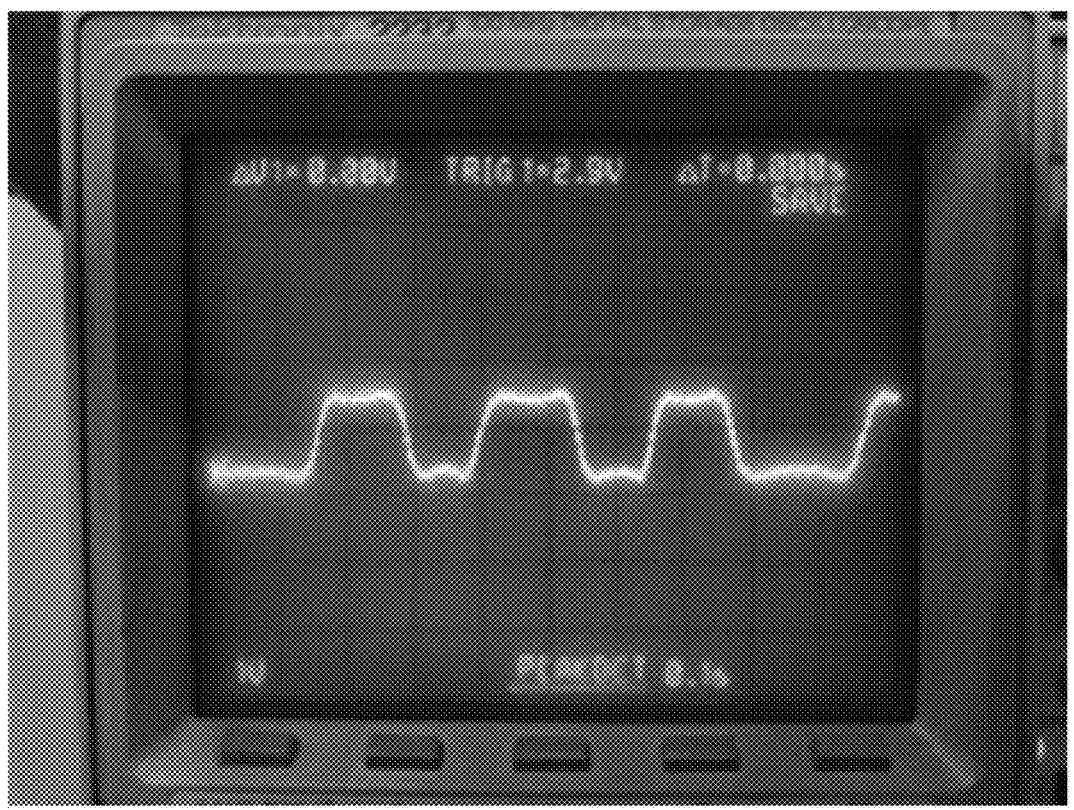
FIG. 16-a
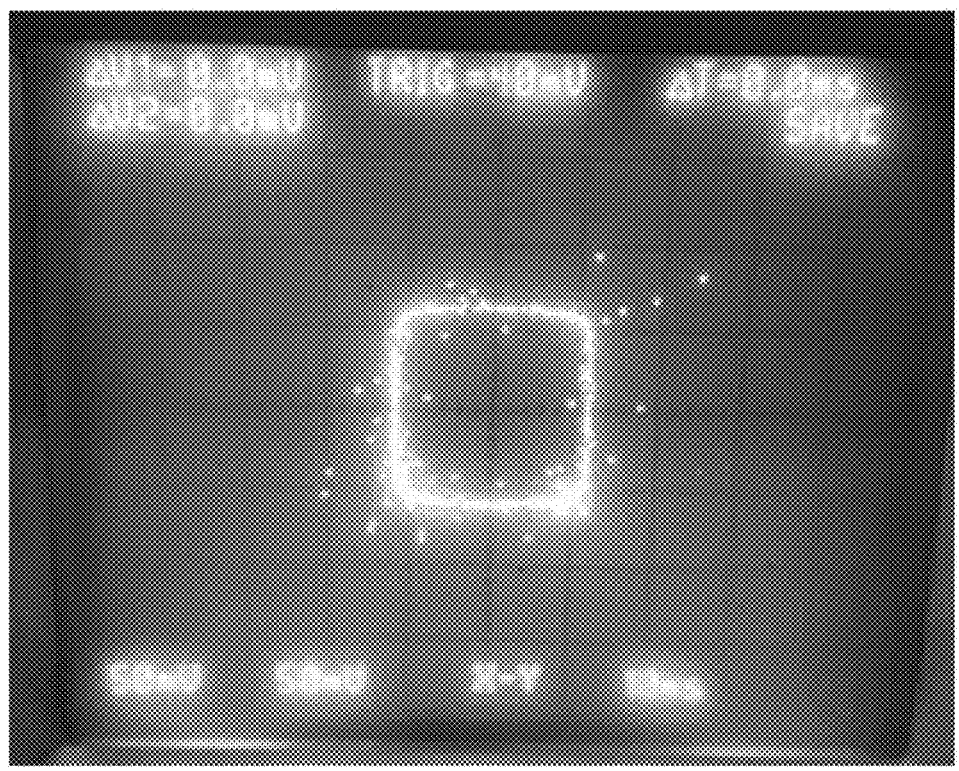
FIG. 16-b

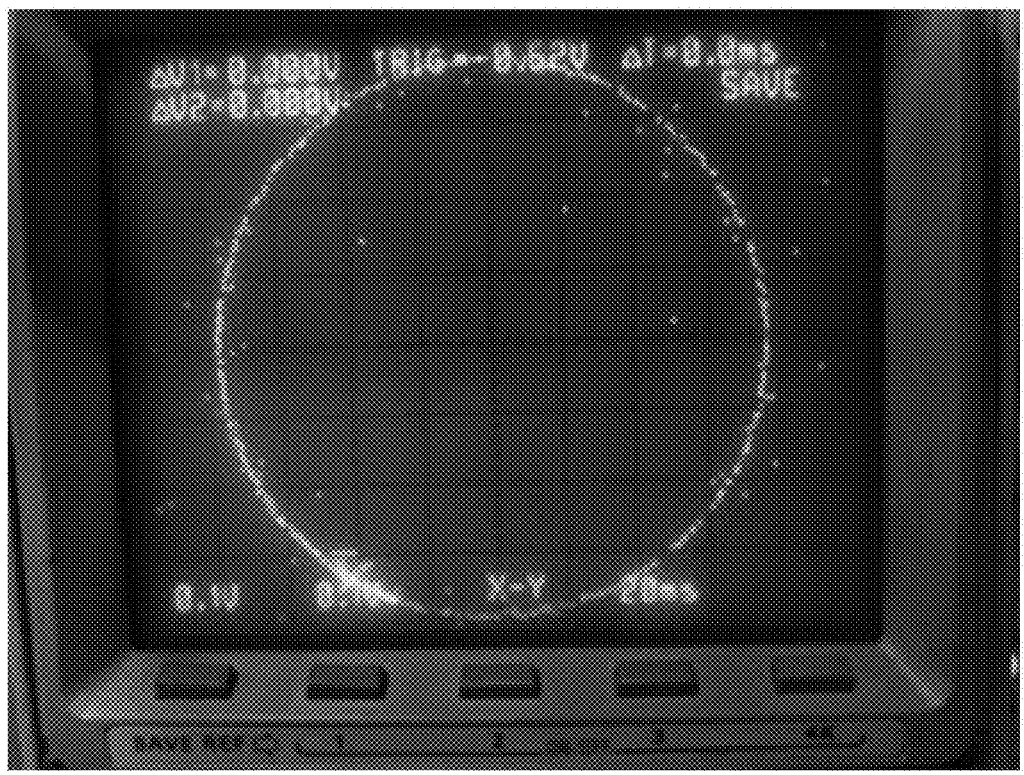
FIG. 16-c

ZERO-FORCE EQUALIZED VECTOR SYNTHESIS ABSOLUTE ENCODER METHOD AND APPARATUS

CROSS-REFERENCE TO RELATED APPLICATIONS

This application claims priority to Korean Patent Application No. 10-2019-0004810 filed Jan. 14, 2019, Korean Patent Application No. 10-2019-0100588 filed Aug. 16, 2019, and International Patent Application No. PCT/KR2019/011948 filed Sep. 16, 2019, the contents of which are incorporated by reference herein in its entirety.

REFERENCES CITED

U.S. Patent Documents

U.S. Pat. No. 7,999,533 B2 Aug. 16, 2011 Mark E. LaCroix

Foreign Patent Documents

KR KR101749522 Jun. 15, 2017

Other Publications

[1], http://www.timkenencoders.com/Content/uploads/Timken-MD-Offset-and-Strength-Comparison-Paper-1192-2154.pdf
[2], http://wireless-systems.ece.gatech.edu/4601/lectures-2012/week13.pdf
[3], https://en.wikipedia.org/wiki/Zero_forcing_equalizer

TECHNICAL FIELD

The claimed subject matter relates generally to electromechanical systems and, more particularly, to an absolute encoder apparatus and the methods for taking the precise displacement measurement and obtaining the absolute position of objects that move linearly or circularly. The embodiments of the invention mainly describe analog-type Hall sensor encoders because of their simplicity and cost effectiveness; however, it can also be applied to other displacement-measuring apparatus such as magnetoelectric, magnetoresistive, capacitive, and inductive encoders as well as resolvers or optical encoders.

BACKGROUND

A Hall-effect sensor is a transducer that is excited by an external magnetic field. In response to a magnetic field variation, the Hall sensor varies its voltage, from which the displacement, angular positioning, speed, and current sensing can be determined. Hall sensor encoders are increasingly and widely used in industrial control systems due to its structural simplicity and durability in harsh environments, all at a much lower cost than resolvers or optical encoders.

The principle of Hall-effect is depicted in FIG. 1(a), and the characteristics of a Hall-effect sensor output voltage ($V_{OUT}$) are shown in FIG. 1(b). When the current (I) flows through a conductor, and the magnetic field (B) is applied perpendicularly to the current, a voltage difference ($V_{OUT}$) across the electrical conductor is observed. Let Hall constant be $\gamma$, then output voltage $V_{OUT}=(\gamma \times I \times B)$ (V), and magnetic flux B can be expressed as $B=K\times(M/R^2)$, where K is permeability, M is the magnetic field strength of the magnet source, and R is the distance between the Hall-effect sensor and magnet source.

Since the magnetic flux (B) is inversely proportional to the square of the distance between the Hall-effect sensor and magnet source, the Hall-effect sensor output voltage is very abrupt and susceptible to be saturated, as depicted in FIG. 1(b).

The following disadvantages of Hall-effect sensor encoders have prevented it from being used in high-precision applications: the Hall sensor output voltage is easily saturated because the magnetic flux passing through the Hall sensor is inversely proportional to the square of the distance between the Hall sensor and magnet source; the magnetic flux is biased to a certain direction by internal or external magnetic flux disturbances; the magnetic flux is distorted by physical structure deformation or erroneous characteristics of magnet materials; and the Hall senor output is directly affected by the applied voltage and can be proportionally degraded by ripple or variation of the supply voltage.

FIG. 2(a) illustrates an ideal sinusoidal signal of the Hall sensor output, while FIG. 2(b) illustrates an exemplary distorted signal typically found over a widely used permanent magnet. Due to the aforementioned limitations, Hall sensor encoders are usually used only for low-resolution applications that require less than 12-bit resolution, while optical encoders are used for high-speed and high-resolution applications.

In case a Hall sensor output voltage is distorted as shown in FIG. 2(b), it is practically impossible to achieve high resolution in analog Hall sensor encoders if the Hall sensor output voltage signals are directly processed to construct the two orthogonal displacement signals, $\sin(\theta)$ and $\cos(\theta)$. The displacement position ($\theta$) of the moving object is determined by taking the arctangent of the two orthogonal displacement signals.

There have been many trials to obtain the two robust orthogonal signals from the signals of Hall sensors. Simply, the two orthogonal displacement signals are directly constructed from the two phase signals (sine and cosine) of two Hall sensors. Or a plurality of sine and cosine signals is combined from a plurality of Hall sensors to construct more robust two orthogonal displacement signals.

A mathematical transformation called the Clarke Transformation (a.k.a., Scott-T Transformer)—which produces a two-phase electric power from a three-phase source—has been applied to convert three phase signals from three Hall sensors, which are 120° apart, into two orthogonal displacement signals. However, the orthogonality of two orthogonal displacement signals constructed from two or three phase Hall sensors does not hold well enough to achieve high-resolution accuracy, since the two constructed orthogonal displacement signals cannot overcome the direct influence of the distortion or saturation of Hall sensors, as illustrated in FIG. 2(b).

In order to construct a more robust orthogonal signal, inventions employing more than three phases of Hall sensors have been disclosed. U.S. Pat. No. 7,999,533 disclosed a method by which a plurality of Hall sensors is distributed around magnetic poles, in which Hall sensors are grouped into a plurality. To match the amplitudes of the two orthogonal displacement signals, $\sin(\theta)$ and $\cos(\theta)$, each group of the Hall sensors' signals is amplified or attenuated, and summed or subtracted with each other for compensation, based on the difference between a magnet length and a string length. The summing or subtracting of a group of signals with the same phase is effective for the lightly distorted signals of Hall sensors, but not so effective for the signals that are in heavy distortions.

As a mathematically proven, optimal method of constructing two orthogonal displacement signals from multiple phase signals has been unknown, most of the commercially available Hall sensor encoders employing more than three Hall sensors use ad-hoc methods and provide sub-optimal performances.

SUMMARY

The invention discloses a generalized and mathematically derived optimal transformation method of two orthogonal displacement signals from noisy and distorted N phase-delayed displacement signals detected on N position sensors, where N is an integer greater than or equal to 4.

For purposes of summarizing, certain aspects, advantages, and novel features are described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

When a plurality of position sensors is positioned on rotor or stator at certain electrical angles over magnetic N-S poles, a plurality of sequentially phase-delayed displacement signals is detected throughout one or multiple electrical periods over the magnetic N-S poles as the rotor moves linearly or circularly.

Based on an innovative mathematical analysis that each phase-delayed displacement signal of position sensor actually contains a component of two orthogonal displacement signals, $\sin(\theta)$ and $\cos(\theta)$, a system of linear equations is constructed with a characteristic matrix that characterizes the relationship between a plurality of phase-delayed displacement signals and their two orthogonal displacement signals.

The recovering procedure of the two orthogonal displacement signals is as follows: the optimal solution of the system of linear equations is found; modeled by Zero-Forcing (ZF) equalization, linear transversal filtering with a plurality of taps is applied to a plurality of phase-delayed displacement signals.

By this distortionless and invertible ZF equalization process, the two orthogonal displacement signals are optimally vector-synthesized from a plurality of phase-delayed displacement signals such that their orthogonality is maximally held by minimizing the noise and distortion induced in the position sensors' signals.

When the ZF equalized vector synthesis method is applied to widely used analog-type Hall sensor encoders, most Hall sensor distortions can be overcome, and 14 bits or higher resolution encoders are easily and economically realized in many practical applications.

The invention begins with a mathematical analysis that each position sensor signal contains a component of two orthogonal displacement signals. In other words, the sequentially phase-delayed sinusoidal displacement signals over a certain electrical period can be expressed by a system of linear equations with two unknown variables: the two orthogonal displacement signals. Therefore, the two orthogonal displacement signals can be mathematically calculated by solving the system of linear equations that involves a matrix inversion. The process of applying the inverse matrix to the output signals of position sensors to recover their two orthogonal displacement signals is analogous to applying zero-forcing (ZF) linear equalization (or detection) to received symbols to recover transmitted symbols in signal processing or digital communications systems.

In accordance with one embodiment, the method of Hall sensors' allocation over multiple electrical periods on magnetic N-S poles, and the method and apparatus of ZF equalization to obtain the two orthogonal displacement signals are provided, where the equalization coefficients are found by solving the system of linear equations. Equalization coefficients, which provide the maximum orthogonality holding property, are chosen by a proper and specific computer simulation by assuming the worst Hall sensor sinusoidal signal.

In accordance with another embodiment, the methods of conveniently generating useful absolute position information are provided, including A-phase and B-phase incremental signal generation, index pulse Z-phase signal generation, an arbitrary phase-delayed absolute-position signal generation, and three phases synchro displacement signals or commutation (U, V, and W) pulses generation.

In accordance with another embodiment, the method of applying the ZF equalization algorithm to resolvers, inductive encoders, capacitive encoders, and optical encoders are provided.

In accordance with another embodiment, the invention presents an exemplary realization of the Hall sensor encoder system over commercially available 10 pole-pairs BLDC motor, in accordance with the presented design flow and methodology. The realized Hall sensor encoder system employing 25 Hall sensors achieves as high as 16 bits of position resolution, the performance of which is comparable to that of optical encoders.

One or more of the above-disclosed embodiments, in addition to certain alternatives, are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

FIG. 1(a) illustrates an exemplary principle of the Hall-effect sensor operation.

FIG. 1(b) illustrates an exemplary output voltage characteristic of a typical Hall sensor output signal in a practical permanent magnet.

FIG. 2(a) illustrates an exemplary ideal sinusoidal signal of the Hall sensor output.

FIG. 2(b) illustrates an exemplary distorted sinusoidal signal of the Hall sensor output due to magnetic flux saturation in a practical permanent magnet.

FIG. 4(a) illustrates an exemplary allocation of 15 Hall sensors over one N-S pole pair of permanent magnet in a linear encoder.

FIG. 4(b) illustrates an exemplary allocation of 15 Hall sensors over one N-S pole pair of permanent magnet in a rotary encoder.

FIG. 4(c) illustrates an exemplary allocation of 15 Hall sensors over the $1^{st}$ N-S pole pair of permanent magnet in two N-S pole pairs rotary encoder.

FIG. 4(d) illustrates an exemplary allocation of 15 Hall sensors over two N-S pole pairs of permanent magnet in two N-S pole pairs rotary encoder.

FIG. 4(e) illustrates an exemplary allocation of 15 Hall sensors over three N-S pole pairs of permanent magnet in three N-S pole pairs rotary encoder.

FIG. 4(f) illustrates an exemplary allocation of 15 Hall sensors over five N-S pole pairs of permanent magnet in five N-S pole pairs rotary encoder.

FIG. 5(a) illustrates exemplary ideal sinusoidal signals from N=15 Hall sensors.

FIG. 5(b) illustrates exemplary distorted sinusoidal signals from N=15 Hall sensors in a practical permanent magnet.

FIG. 5(c) illustrates exemplary fully saturated square wave signals from N=15 Hall sensors in a practical permanent magnet.

FIG. 6 illustrates an exemplary signal processing flow of ZF equalization in EQ. (9).

FIG. 7(a) illustrates an exemplary operational amplifier (op-amp) circuit diagram for the orthogonal signal $\sin(\theta)$ synthesis for N=15.

FIG. 7(b) illustrates an exemplary operational amplifier (op-amp) circuit diagram for the orthogonal signal $\cos(\theta)$ synthesis for N=15.

FIG. 8(a) illustrates two orthogonal displacement signals, $\sin(\theta)$ and $\cos(\theta)$, output of ZF equalizer for N=15 when square wave Hall sensor signal is applied.

FIG. 8(b) illustrates a Lissajous graph of the two orthogonal displacement signals in FIG. 8(a).

FIG. 9(a) illustrates two orthogonal displacement signals, $\sin(\theta)$ and $\cos(\theta)$, output of ZF equalizer for N=15 when distorted sinusoidal Hall sensor signal is applied.

FIG. 9(b) illustrates a Lissajous graph of the two orthogonal displacement signals in FIG. 9(a).

FIG. 12 illustrates an exemplary block diagram for the generation of high precision commutation pulses (U, V, and W signals) for BLDC motor application.

FIG. 13(a) illustrates an exemplary signal processing flow for a generation of delayed $\sin(\theta)$ orthogonal signal, $\sin(\theta-120)$.

FIG. 13(b) illustrates an exemplary signal processing flow for a generation of delayed $\sin(\theta)$ orthogonal signal, $\sin(\theta-240)$.

FIG. 13(c) illustrates an exemplary block diagram of ZF equalized digital Hall sensor encoder system.

FIG. 13(d) illustrates an exemplary block diagram of index pulse, Z-phase, signal generation.

FIG. 13(e) illustrates an exemplary block diagram of ZF equalized 5-phase resolver design.

FIG. 13(f) illustrates an exemplary block diagram of ZF equalized 5-phase inductive encoder design.

FIG. 13(g) illustrates an exemplary block diagram of ZF equalized 5-phase capacitive encoder design.

FIG. 14(a) illustrates an exemplary block diagram of a typical optical encoder system.

FIG. 14(b) illustrates an exemplary block diagram of ZF equalized 5-phase analog optical encoder design.

FIG. 14(c) illustrates another exemplary block diagram of ZF equalized 5-phase analog optical encoder design.

FIG. 15(a) illustrates two orthogonal displacement signals, $\sin(\theta)$ and $\cos(\theta)$, output of ZF equalizer for N=25 when square wave Hall sensor signal is applied.

FIG. 15(b) illustrates a Lissajous graph of two orthogonal displacement signals in FIG. 15(a).

FIG. 16(a) shows an exemplary captured picture on oscilloscope for Hall sensor signal in exemplary realized 10 pole-pairs BLDC motor with 25 Hall sensors encoder.

FIG. 16(b) shows an exemplary captured picture on oscilloscope of a Lissajous graph of two orthogonal displacement signals in FIG. 16(a) of two Hall sensors, having 90° phase difference.

FIG. 16(c) shows an exemplary captured picture on oscilloscope of a Lissajous graph for the two orthogonal displacement signals in realized and assembled N=25 ZF equalized Hall encoder system.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

Figure 3:
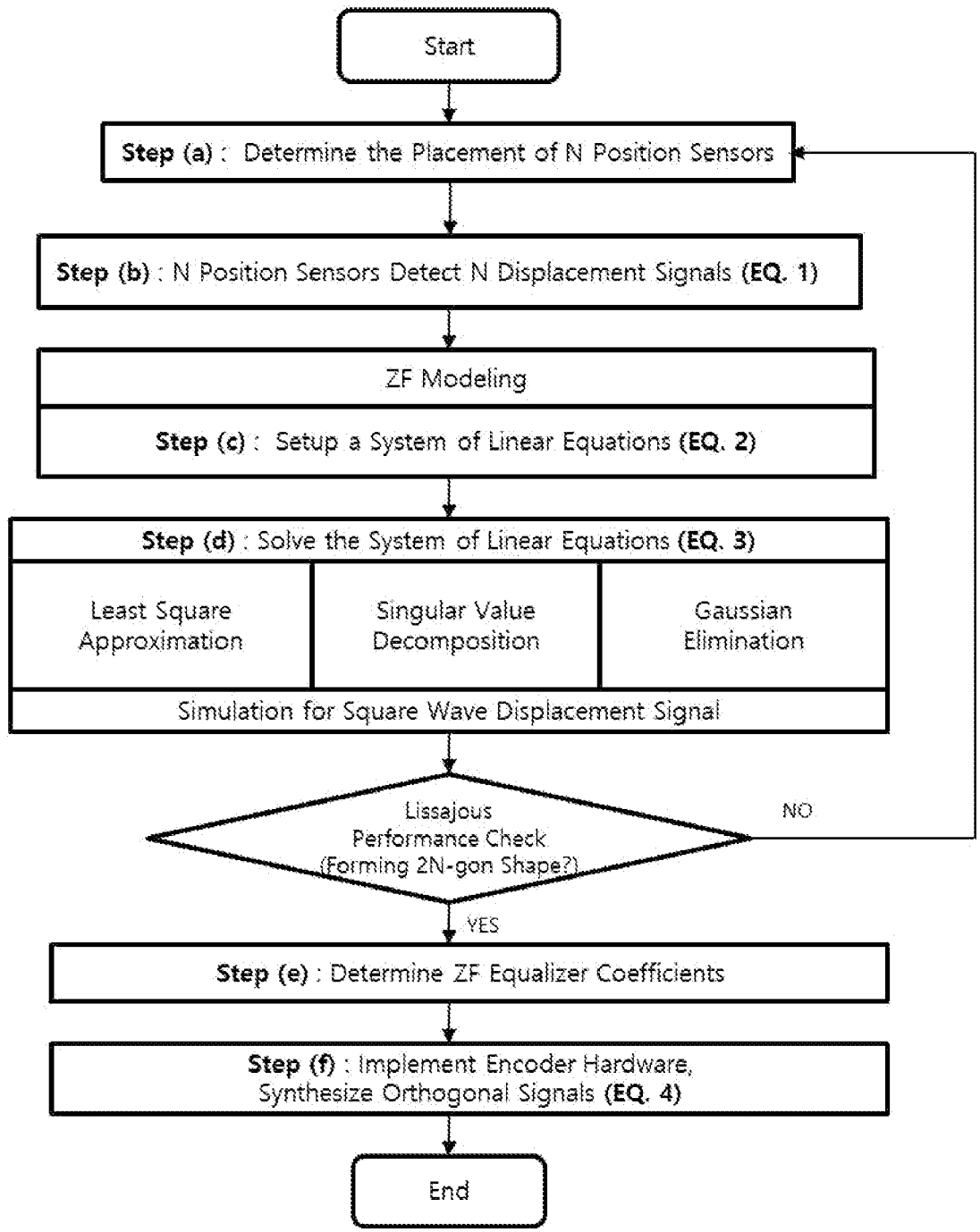
FIG. 3 illustrates an exemplary design flow chart of the ZF equalized vector synthesis absolute Hall sensor encoder.

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

In what follows, the exemplary description of embodiment is mainly explained on Hall sensors; however, the invention is not restricted to Hall sensors, but is fully applicable to other measurement sensors with various excitation sources such as magnetic, electrostatic, electromagnetic, optical, and sonic sources, etc.

Technological Goal

As previously noted, the two orthogonal displacement signals are conventionally constructed by combining a plurality of two phase signals, or by applying Clarke transformation for three phase signals. While several quantitative analytical approaches have attempted to construct two orthogonal displacement signals from more than four phase signals of more than 4 Hall sensors, the complete analytical mathematical model has not been disclosed; thus, Hall sensor encoders have been used only in low-resolution applications.

When position sensors are placed over the rotor or stator of a linear or rotary encoder, as the rotor moves linearly or circularly, each Hall position sensor outputs a sinusoidal displacement signal whose phase is delayed corresponding to its positioned electrical angle in 360°. One physical N-S pole pair is equivalent to one period of 360° in electrical sense as the electrical angle wraps around (modulo 360°) at every N-S pole pair.

The signal processing to synthesize two orthogonal displacement signals from N phase-delayed sinusoidal displacement signals is modeled as the N-tap ZF equalizer. The ZF equalizer transversal filter tap coefficients are calculated by solving the system of linear equations relating between N phase-delayed displacement signals and their two orthogonal displacement signals.

The Hall sensor encoder performance depends on the number of Hall sensors employed and their placed positions over N-S poles. The noise and distortion induced in the Hall sensor signal is minimized in the process of ZF equalization; thus, the optimal two orthogonal displacement signals, sin (θ) and cos(θ), are synthesized in a sense of maximizing their orthogonality for a given number of Hall sensors and their placed positions.

In selecting the best performing N-tap coefficients of the ZF equalizer, the response of digital Hall sensor signal is inspected by a proper simulation in order to verify the encoder performance to be implemented.

Therefore, one object of the invention is to provide a systematic and generalized signal processing algorithm in processing N phase-delayed position sensors' signals to obtain the optimal two orthogonal displacement signals, which produces the absolute Hall sensor encoders, the achieved precision of which is as good as that of optical encoders.

Another objective of the invention is to provide a way of designing and implementing the presented signal processing algorithm to realize high-precision absolute encoders with various kinds of position sensors.

Technological Solution

In order to achieve the aforementioned technological goals, the ZF equalized vector synthesis absolute encoder is disclosed in the following steps, (a) to (f):

(a) N Hall sensors ($H_1 \sim H_N$) are positioned linearly or circularly on rotor (or stator) over one or multiple electrical angle periods caused by magnetic N-S pole-pairs source, where N is greater than or equal to 4. Each Hall sensor generates a sequentially phase-delayed displacement signal in accordance with each Hall sensor's positioned phase angle in 360°.

(b) The output signals ($H_{1out} \sim H_{Nout}$) of N Hall sensors are expressed as sequentially phase-delayed displacement signals of a single-source signal, $\sin(\theta)$, as in EQ. (1), where N Hall sensors ($H_1 \sim H_N$) are assumed to be equally spaced by $360°/N$ in electrical angle. However, Hall sensors can be located at any certain phase angle positions distributed over one or multiple periods of electrical angle.

(c) By applying the sine addition formula to EQ. (1), a system of linear equations is constructed on the basis that the sum of all other tap's signals, other than own tap's signal, is forced to be zero at each tap, that characterizes between the N Hall sensors' signals and their two orthogonal displacement signals. A characteristic matrix K that is dependent on the number of Hall sensors employed and their positions in electrical angle represents that the Hall sensors' signals are the K matrix linear transformation of the two orthogonal displacement signals, as shown in EQ. (2).

(d) In solving the system of linear equations by inverse transformation, the inverse of K matrix is calculated. K is not a square matrix, but its pseudo-inverse $K^+$ exists. The two orthogonal displacement signals are found by the $K^+$ linear transformation of N Hall sensors' signals as shown in EQ. (3). The two orthogonal displacement signals are linearly synthesized from N phase-delayed sinusoidal displacement signals by ZF criterion. $K^+$ may have multiple solutions, among which the best solution is chosen.

(e) $K^+$ comprises the ZF equalizer coefficients, $S_1 \sim S_N$ and $C_1 \sim C_N$ for the vector synthesis of two orthogonal displacement signals, $\sin(\theta)$ and $\cos(\theta)$, respectively. In other words, the two orthogonal displacement signals, $\sin(\theta)$ and $\cos(\theta)$, are vector synthesized from ZF equalization of $H_1 \sim H_N$ signals, as shown in EQ. (4). Based on EQ. (4), ZF linear transversal filtering is performed.

(f) Obtaining the precise absolute displacement position from the two orthogonal displacement signals, $\sin(\theta)$ and its 90° phase-shifted $\cos(\theta)$ signal, the amplitude and phase distortion of the two signals are minimized throughout the ZF equalization process.

The ZF equalized vector synthesis absolute encoder apparatus comprises a sensing module in which N position sensors ($N \geq 4$) are allocated on rotor (or stator) over one or multiple electrical angle periods of magnetic N-S pole pairs of a linear or rotary encoder. Each Hall sensor generates a sequentially phase-delayed displacement signal in accordance with each Hall sensor's positioned phase angle in 360°, as one period of electrical angle repeats on each N-S pole pair, as shown in EQ. (1).

Phase-delayed displacement signals ($H_{1out} \sim H_{Nout}$) are connected to the ZF equalized vector synthesis module that outputs two orthogonal displacement signals. At each equalizer tap, the ZF equalizer forces the sum of all filter tap's signals other than its own tap's signal to be zero.

The ZF equalized vector synthesis module is as follows: by applying the sine addition formula, EQ. (1) is converted into the ZF equalization characteristic equation as in EQ. (2); the characteristic equation is solved and $S_1 \sim S_N$ and $C_1 \sim C_N$ filter coefficients for $\sin(\theta)$ and $\cos(\theta)$ vector synthesis are found as in EQ. (3); resistors $RS_1 \sim RS_N$ and $RC_1 \sim RC_N$ corresponding to $S_1 \sim S_N$ and $C_1 \sim C_N$ coefficients are prepared, respectively; $H_{1out} \sim H_{Nout}$ signals are input to $RS_1 \sim RS_N$ and their outputs are connected to operation amplifier (OP-amp) for $\sin(\theta)$ synthesis; $H_{1out} \sim H_{Nout}$ signals are input to $RC_1 \sim RC_N$ and their outputs are connected to operation amplifier (OP-amp) for $\cos(\theta)$ synthesis.

$$H_{1out}: \mathrm{Sin}(\theta - 0) = \mathrm{Sin}(\theta) * \mathrm{Cos}(0) - \mathrm{Cos}(\theta) * \mathrm{Sin}(0) \qquad \text{EQ. (1)}$$

$$H_{2out}: \mathrm{Sin}\left(\theta - \frac{360°}{N} \times 1\right) =$$
$$\mathrm{Sin}(\theta) * \mathrm{Cos}\left(\frac{360°}{N} \times 1\right) - \mathrm{Cos}(\theta) * \mathrm{Sin}\left(\frac{360°}{N} \times 1\right)$$

$$H_{3out}: \mathrm{Sin}\left(\theta - \frac{360°}{N} \times 2\right) =$$
$$\mathrm{Sin}(\theta) * \mathrm{Cos}\left(\frac{360°}{N} \times 2\right) - \mathrm{Cos}(\theta) * \mathrm{Sin}\left(\frac{360°}{N} \times 2\right)$$

$$\vdots$$

$$H_{Nout}: \mathrm{Sin}\left(\theta - \frac{360°}{N} \times (N-1)\right) =$$
$$\mathrm{Sin}(\theta) * \mathrm{Cos}\left(\frac{360°}{N} \times (N-1)\right) - \mathrm{Cos}(\theta) * \mathrm{Sin}\left(\frac{360°}{N} \times (N-1)\right)$$

$$\begin{bmatrix} H_{1out} \\ H_{2out} \\ H_{3out} \\ \vdots \\ H_{Nout} \end{bmatrix} = \begin{bmatrix} \mathrm{Sin}(\theta - 0) \\ \mathrm{Sin}\left(\theta - \frac{360°}{N} \times 1\right) \\ \mathrm{Sin}\left(\theta - \frac{360°}{N} \times 2\right) \\ \vdots \\ \mathrm{Sin}\left(\theta - \frac{360°}{N} \times (N-1)\right) \end{bmatrix} = \qquad \text{EQ. (2)}$$

$$\begin{bmatrix} \mathrm{Cos}(0) & -\mathrm{Sin}(0) \\ \mathrm{Cos}\left(\frac{360°}{N} \times 1\right) & -\mathrm{Sin}\left(\frac{360°}{N} \times 1\right) \\ \mathrm{Cos}\left(\frac{360°}{N} \times 2\right) & -\mathrm{Sin}\left(\frac{360°}{N} \times 2\right) \\ \vdots & \vdots \\ \mathrm{Cos}\left(\frac{360°}{N} \times (N-1)\right) & -\mathrm{Sin}\left(\frac{360°}{N} \times (N-1)\right) \end{bmatrix} * \begin{bmatrix} \mathrm{Sin}(\theta) \\ \mathrm{Cos}(\theta) \end{bmatrix} = K * \begin{bmatrix} \mathrm{Sin}(\theta) \\ \mathrm{Cos}(\theta) \end{bmatrix}$$

-continued $$\begin{bmatrix} \text{Sin}(\theta) \\ \text{Cos}(\theta) \end{bmatrix} = \quad \text{EQ. (3)}$$

$$K^+ * \begin{bmatrix} \text{Sin}(\theta - 0) \\ \text{Sin}\left(\theta - \frac{360°}{N} \times 1\right) \\ \text{Sin}\left(\theta - \frac{360°}{N} \times 2\right) \\ \vdots \\ \text{Sin}\left(\theta - \frac{360°}{N} \times (N-1)\right) \end{bmatrix} = \begin{bmatrix} S_1 & S_2 & S_3 & \cdots & S_N \\ C_1 & C_2 & C_3 & \cdots & C_N \end{bmatrix} * \begin{bmatrix} \text{Sin}(\theta - 0) \\ \text{Sin}\left(\theta - \frac{360°}{N} \times 1\right) \\ \text{Sin}\left(\theta - \frac{360°}{N} \times 2\right) \\ \vdots \\ \text{Sin}\left(\theta - \frac{360°}{N} \times (N-1)\right) \end{bmatrix}$$

$$\text{Sin}(\theta) = S_1 \text{Sin}(\theta - 0) + S_2 \text{Sin}\left(\theta - \frac{360°}{N} \times 1\right) + \quad \text{EQ. (4)}$$
$$S_3 \text{Sin}\left(\theta - \frac{360°}{N} \times 2\right) + \ldots + S_N \text{Sin}\left(\theta - \frac{360°}{N} \times (N-1)\right)$$
$$\text{Cos}(\theta) = C_1 \text{Sin}(\theta - 0) + C_2 \text{Sin}\left(\theta - \frac{360°}{N} \times 1\right) +$$
$$C_3 \text{Sin}\left(\theta - \frac{360°}{N} \times 2\right) + \ldots + C_N \text{Sin}\left(\theta - \frac{360°}{N} \times (N-1)\right)$$

Advantageous Effect

As a non-contacting magnetoelectric sensor, the Hall sensor is a durable sensor without much degradation in sensing performance over aging or usual temperature variations. The Hall sensor is small in size, and is easily and economically implemented in various applications. However, the biggest drawback of the Hall sensor is the lack of signal accuracy in sensing, because its typical analog output signal in the practical encoder is far from an ideal sinusoidal signal. Therefore, Hall sensors are mostly used as a digital sensor, namely, considering Hall sensor output as a binary state of 0 or 1, rather than a more informational analog signal sensor.

In accordance with the invention, however, the deficiencies of distortion-prone Hall sensor sinusoidal signals are overcome by the ZF equalized vector synthesis signal processing technique. The ZF equalized vector synthesis is the optimal linear transformation of Hall sensor sinusoidal signals into their two orthogonal displacement signals in maximizing their orthogonality, from which absolute displacement position information of encoder is precisely obtained. The ZF equalized vector synthesis method is generalized to an arbitrary number of Hall sensors. Therefore, a certain desired level of resolution accuracy can be achieved by adjusting the number of taps in ZF equalization, namely, the number of Hall sensors employed, and of which performance can be predicted by a proper simulation before implementation.

Hall sensor encoders are conveniently and economically realized on a printed circuit boards (PCB). ZF equalization vector synthesis signal processing is also conveniently implemented either in analog circuit by operational (OP) amps or in digital circuit by digital processor on the PCB.

Based on the disclosed specific simulation method and exemplary realization to be described in the later sections, most high-resolution resolvers or optical encoders can be replaced by the ZF equalized vector synthesis Hall sensor encoders, by employing as many as 10 to 25 Hall sensors. The ZF equalized vector synthesis transformation method lays the important groundwork for very precise and economical absolute encoder realization in many practical applications.

The present invention can also be further applied to other electro-magnetic sensing encoder apparatus and optical encoders as long as the encoder apparatus provides sequentially phase-delayed displacement signals over a certain electrical cycle, which can be modeled and transformed by the ZF equalizer, and from which the maximally orthogonalized two orthogonal displacement signals, $\sin(\theta)$ and $\cos(\theta)$, can be obtained.

Implementation of the Invention

FIG. 3 illustrates the overall design flow of the ZF equalized vector synthesis absolute encoder system.

When N Hall sensors are positioned at certain electrical phase angle positions over one or multiple N-S pole pairs in a linear or rotary encoder, N position sensors will detect N sequentially phase-delayed sinusoidal displacement signals in accordance with their positioned electrical phase angles as the rotor moves.

EQ. (2) shows that N sequentially phase-delayed sinusoidal displacement signals are decomposed into their two orthogonal displacement signals' components by the characteristic matrix K. Inversely, the two orthogonal displacement signals can be composed from N sequentially phase-delayed sinusoidal displacement signals by the pseudo-inverse of the characteristic matrix K, as shown in EQ. (3). EQ. (4) is implemented as a linear transversal equalizer with time delay T and equalizer coefficients of $K^+$.

As $K^+$ may have multiple solutions, choosing the one that provides the maximum orthogonal holding property is the essential step in ZF equalized vector synthesis implementation.

In choosing the best $K^+$ solution, the invention discloses a proper and specific simulation method of checking the Lissajous graph response of the two orthogonal displacement signals when phase-delayed square wave displacement signals are input to the ZF equalized vector synthesis module.

The Number of Hall Sensors

The larger number of Hall sensors would provide a superior performance as the number of taps in ZF equalizer increases. Due to space limitation, however, the number of Hall sensors to be allocated in a practical encoder is limited. Depending on the space of the N-S pole pairs of rotor or stator and the target resolution level to achieve, the number of Hall sensors would be as small as 4 and as large as more than a few hundreds. It is generally observed in typical realizations that 16 bits of resolution is achieved when 15 or more Hall sensors are employed, whereas 14 to 15 bits of resolution is achieved when 5 to 9 Hall sensors are employed. When the number of Hall sensors employed is greater than or equal to 25, the resolution performance is as good as that of optical encoders.

In what follows, as one of the most widely used position sensors, the exemplary description of the embodiment is explained mainly based on Hall-sensor absolute encoders employing 15 taps (Hall sensors). However, it is to be understood that the invention is not limited to the details of the construction and the arrangement of the components set forth in the following description and illustrated drawings.

Hall Sensors' Placed Positions

The next step is to determine the Hall sensors' positions in an electrical angle defined over one period of 360°. Hall sensors can be positioned at any place with an equivalent electrical angle over multiple N-S pole pairs. The ZF equalized vector synthesis will produce the best optimal orthogonal signals for a given specific Hall sensors' position as long as the sensors have sequentially phase-delayed displacement signals, even though Hall sensors are placed irregularly.

In order to have the best performing encoder for a given number of Hall sensors, however, Hall sensors are to be positioned in a mutually exclusive way, in a physical and electrical sense, so that diversified and less correlated signals are detected. Therefore, Hall sensors are recommended to be regularly distributed over all available spaces defined in one or multiple electrical angle periods.

The most effective way is to place Hall sensors at positions that are partitioned by odd number positions over one period of electrical angle of 360°, where the odd number positions are greater than or equal to the number of Hall sensors to be actually employed. Over all available odd number partitioned positions, some positions can be skipped (or punctured) or an even number of Hall sensors can be placed.

When the encoder of interest has multiple electrical angle cycles, namely multiple N-S magnetic pole pairs, it is desirable to distribute Hall sensors over the entire electrical angle cycles evenly while keeping the same odd number partitioning defined in one period of electrical angle, so that the Hall sensor signals are physically and electrically diversified.

For single N-S pole pair linear and rotary encoder, FIG. 4(a) and FIG. 4(b) show 15 evenly positioned Hall sensors, which results in an electrical angle delay of 24° between adjacent Hall sensors. For two N-S pole pairs encoder, 15 Hall sensors are evenly positioned only over the first pole pair in FIG. 4(c), while evenly over the two pole pairs in FIG. 4(d).

FIG. 4(e) and FIG. 4(f) show 15 evenly positioned Hall sensors over 3 pole pairs and 5 pole pairs, respectively. Even though Hall sensor positions are physically different in FIG. 4(a) to FIG. 4(f), they are all equivalent in an electrical sense, generating 24° phase-delayed 15 sinusoidal displacement signals ($H_1$~$H_{15}$) over one period of electrical angle.

ZF Equalization Modeling and Characteristic Matrix

The central idea of the present invention is the novel ZF equalization modeling in signal processing of Hall sensors' signals to obtain their two orthogonal displacement signals. The ZF equalization modeling can be easily explained by an exemplary case of N=15 Hall sensors. The output of 15 Hall sensors are 15 sequentially phase-delayed sinusoidal displacement signals; each phase is delayed by 24°, as sensing at each Hall sensor is successively 24° delayed, as the rotor (or stator) moves linearly or circularly; $\sin(\theta)$, $\sin(\theta-24)$, $\sin(\theta-48)$, $\sin(\theta-288)$, $\sin(\theta-312)$, $\sin(\theta-336)$.

Hall sensors in practical encoders face distortions, and their detected sinusoidal displacement signals ($H_1$~$H_{15}$) are distorted in general. Depending on the distortion level, FIG. 5(a) shows the case when Hall sensors produce ideal sinusoidal signals, somewhat distorted sinusoidal signals in FIG. 5(b), and fully saturated square wave signals in FIG. 5(c).

It is obvious that ZF equalization would produce two ideal orthogonal signals by the ideal sinusoidal input signals. It is of the invention's interest to see the ZF equalization performance for somewhat distorted signals and square wave signals.

In EQ. (1), it is shown that N phase-delayed displacement signals from N Hall sensors can be decomposed into their two orthogonal displacement signals. When N=15, the 15 Hall sensors' signals can be expressed as follows after applying sine addition formula, $\sin(x+y)=\sin(x)*\cos(y)+\cos(x)*\sin(y)$:

$H1$ out: $\sin(\theta-0)=\sin(\theta)*\cos(\theta)-\cos(\theta)*\sin(\theta)=\sin(\theta)$ $H2$ out: $\sin(\theta-24)=\sin(\theta)*\cos(24)-\cos(\theta)*\sin(24)=(+0.913*\sin(\theta))-(+0.407*\cos(\theta))$ $H3$ out: $\sin(\theta-48)=\sin(\theta)*\cos(48)-\cos(\theta)*\sin(48)=(+0.669*\sin(\theta))-(+0.743*\cos(\theta))$ $H4$ out: $\sin(\theta-72)=\sin(\theta)*\cos(72)-\cos(\theta)*\sin(72)=(+0.309*\sin(\theta))-(+0.951*\cos(\theta))$ $H5$ out: $\sin(\theta-96)=\sin(\theta)*\cos(96)-\cos(\theta)*\sin(96)=(-0.104*\sin(\theta))-(+0.994*\cos(\theta))$ $H6$ out: $\sin(\theta-120)=\sin(\theta)*\cos(120)-\cos(\theta)*\sin(120)=(-0.500*\sin(\theta))-(+0.866*\cos(\theta))$ $H7$ out: $\sin(\theta-144)=\sin(\theta)*\cos(144)-\cos(\theta)*\sin(144)=(-0.809*\sin(\theta))-(+0.588*\cos(\theta))$ $H8$ out: $\sin(\theta-168)=\sin(\theta)*\cos(168)-\cos(\theta)*\sin(168)=(-0.978*\sin(\theta))-(+0.208*\cos(\theta))$ $H9$ out: $\sin(\theta-192)=\sin(\theta)*\cos(192)-\cos(\theta)*\sin(192)=(-0.978*\sin(\theta))-(-0.208*\cos(\theta))$ $H10$ out: $\sin(\theta-216)=\sin(\theta)*\cos(216)-\cos(\theta)*\sin(216)=(-0.809*\sin(\theta))-(-0.588*\cos(\theta))$ $H11$ out: $\sin(\theta-240)=\sin(\theta)*\cos(240)-\cos(\theta)*\sin(240)=(-0.500*\sin(\theta))-(-0.866*\cos(\theta))$ $H12$ out: $\sin(\theta-264)=\sin(\theta)*\cos(264)-\cos(\theta)*\sin(264)=(-0.104*\sin(\theta))-(-0.994*\cos(\theta))$ $H13$ out: $\sin(\theta-288)=\sin(\theta)*\cos(288)-\cos(\theta)*\sin(288)=(+0.309*\sin(\theta))-(-0.951*\cos(\theta))$ $H14$ out: $\sin(\theta-312)=\sin(\theta)*\cos(312)-\cos(\theta)*\sin(312)=(+0.669*\sin(\theta))-(-0.743*\cos(\theta))$ $H15$ out: $\sin(\theta-336)=\sin(\theta)*\cos(336)-\cos(\theta)*\sin(336)=(+0.913*\sin(\theta))-(-0.407*\cos(\theta))$  EQ. (5)

EQ. (5) shows that Hall sensors' signals are linear combinations of $\sin(\theta)$ and $\cos(\theta)$, the two orthogonal displacement signals. As in EQ. (6), for $H_{1out}$~$H_{15out}$ signals, the ZF equalizer system equation is constructed to satisfy that at each tap, the sum of all other tap's Hall sensor signals is forced to be zero except at its own tap's signal.

$$\begin{bmatrix} H1\text{ out} \\ H2\text{ out} \\ H3\text{ out} \\ H4\text{ out} \\ H5\text{ out} \\ H6\text{ out} \\ H7\text{ out} \\ H8\text{ out} \\ H9\text{ out} \\ H10\text{ out} \\ H11\text{ out} \\ H12\text{ out} \\ H13\text{ out} \\ H14\text{ out} \\ H15\text{ out} \end{bmatrix} = \begin{bmatrix} \sin(\theta-0) \\ \sin(\theta-24) \\ \sin(\theta-48) \\ \sin(\theta-72) \\ \sin(\theta-96) \\ \sin(\theta-120) \\ \sin(\theta-144) \\ \sin(\theta-168) \\ \sin(\theta-192) \\ \sin(\theta-216) \\ \sin(\theta-240) \\ \sin(\theta-264) \\ \sin(\theta-288) \\ \sin(\theta-312) \\ \sin(\theta-336) \end{bmatrix} = \begin{bmatrix} 1.000 & 0.000 \\ 0.913 & -0.407 \\ 0.669 & -0.743 \\ 0.309 & -0.951 \\ -0.104 & -0.994 \\ -0.500 & -0.866 \\ -0.809 & -0.588 \\ -0.978 & -0.208 \\ -0.978 & 0.208 \\ -0.809 & 0.588 \\ -0.500 & 0.866 \\ -0.104 & 0.994 \\ 0.309 & 0.951 \\ 0.669 & 0.743 \\ 0.913 & 0.407 \end{bmatrix} * \begin{bmatrix} \sin(\theta) \\ \cos(\theta) \end{bmatrix} \quad \text{EQ. (6)}$$

EQ. (6) can be written in the matrix shorthand notation, h=s=Kx, where h and s represents 15×1 vector of Hall sensors' signals and K, the characteristic matrix, represents 15×2 matrix of sine and cosine coefficients in EQ. (5), and x represents 2×1 vector of the orthogonal displacement signals, $\sin(\theta)$ and $\cos(\theta)$.

$$h = s = Kx \qquad \text{EQ. (7)}$$

EQ. (7) is a system of linear equations in which the Hall sensors' signals are decomposed into K and x, where the number of observation of 15 Hall sensor signals in s is larger than the number of unknown, $\sin(\theta)$ and $\cos(\theta)$, in x.

The orthogonal signal x can be calculated by applying the inverse matrix of K to the Hall sensors' signals s. K is not a square matrix, but the pseudo-inverse of K with multiple solutions may exist.

Let the pseudo-inverse of K be $K^+$, the estimation of the orthogonal signal, x, can be expressed as follows:

$$x = K^+ s \qquad \text{EQ. (8)}$$

$$x = \begin{bmatrix} \sin(\theta) \\ \cos(\theta) \end{bmatrix} = \begin{bmatrix} S_1 & S_2 & S_3 & S_4 & S_5 & S_6 & S_7 & S_8 & S_9 & S_{10} & S_{11} & S_{12} & S_{13} & S_{14} & S_{15} \\ C_1 & C_2 & C_3 & C_4 & C_5 & C_6 & C_7 & C_8 & C_9 & C_{10} & C_{11} & C_{12} & C_{13} & C_{14} & C_{15} \end{bmatrix} * \begin{bmatrix} \sin(\theta - 0) \\ \sin(\theta - 24) \\ \sin(\theta - 48) \\ \sin(\theta - 72) \\ \sin(\theta - 96) \\ \sin(\theta - 120) \\ \sin(\theta - 144) \\ \sin(\theta - 168) \\ \sin(\theta - 192) \\ \sin(\theta - 216) \\ \sin(\theta - 240) \\ \sin(\theta - 264) \\ \sin(\theta - 288) \\ \sin(\theta - 312) \\ \sin(\theta - 336) \end{bmatrix} \qquad \text{EQ. (9)}$$

where $$K^+ = \begin{bmatrix} S_1 & S_2 & S_3 & S_4 & S_5 & S_6 & S_7 & S_8 & S_9 & S_{10} & S_{11} & S_{12} & S_{13} & S_{14} & S_{15} \\ C_1 & C_2 & C_3 & C_4 & C_5 & C_6 & C_7 & C_8 & C_9 & C_{10} & C_{11} & C_{12} & C_{13} & C_{14} & C_{15} \end{bmatrix}$$

EQ. (9) is a solution of EQ. (6) in which the estimated signal x can be systematically calculated by applying the pseudo-inverse of K to the Hall sensors' signals. Applying the inverse of the system of linear equations is analogous to applying the inverse channel response to the received symbols in digital communications.

FIG. 6 shows a signal processing flow of EQ. (9) implementation, where the ZF equalizer has 15 taps for 24° sequentially delayed 15 Hall sensors' signals and at each tap sine coefficient ($S_1$, $S_2$, . . . , $S_{15}$) and cosine coefficient ($C_1$, $C_2$, . . . , $C_{15}$) are multiplied, and all multiplied values are added to output the orthogonal displacement signals of $\sin(\theta)$ and $\cos(\theta)$, respectively.

In digital communications, when intersymbol interference (ISI) is introduced in communication channel, received symbols are interfered (mixed) with adjacent symbols. As first proposed by the professor Robert Lucky, the ZF equalizer is derived to achieve adjacent symbols' components to be zero and desired symbol component to be one at the equalizer output.

At each tap of the ZF equalizer in digital communications, the incoming symbol (being delayed between each tap and moves to the next tap) is multiplied by the tap coefficient, and the multiplied values at all taps are added to produce one output. However, when N Hall sensors generate N sequentially phase-delayed displacement signals (symbols) in one electrical cycle 360°, those N phase-delayed symbols are regarded as already physically delayed symbols at each tap position in the ZF equalizer. The phase-delayed Hall sensors' signals are regarded themselves as a specific form of intersymbol interfered signals, of which drawback can be overcome by ZF equalization. As zero-forcing (ZF) linear equalization is proven to be an optimal recovery of transmitted symbols from intersymbol-interfered received symbols, applying the inverse of the system of linear equations to detected position sensors' signal is proven to be an optimal recovery of their two orthogonal displacement signals.

EQ. (6) implies that N sequentially phase-delayed sinusoidal displacement signals are solely consisted of their two orthogonal signals' components, $\sin(\theta)$ and $\cos(\theta)$, and EQ. (9) implies that the two orthogonal signals, $\sin(\theta)$ and $\cos(\theta)$, are inversely calculated by applying the ZF equalizer to N phase-delayed sinusoidal displacement signals. Applying the inverse of K to the Hall sensors' signals forces signal components other than $\sin(\theta)$ and $\cos(\theta)$ to be eliminated at the output, which enables to synthesize the perfect orthogonal signals theoretically.

In sum, the absolute encoder in which N sequentially phase-delayed displacement signals, $V_1$, $V_2$, . . . , $V_N$, are generated from N position sensors positioned at certain phase angle positions in 360° electrical angle can be modeled as N-taps ZF equalizer. The characteristic matrix is constructed on the basis that the sum of all other tap's signals other than own tap's signal is forced to be zero at each tap. By applying the inverse transform of the characteristic matrix, two orthogonal displacement signals are reconstructed such that the noise and distortion induced in Hall sensors' signals are minimized.

So far, the linear transformation criterion of transforming the Hall sensors' signals into the orthogonal signals is by zero-forcing (ZF); however, a more comprehensive minimum mean square error (MMSE)-based transformation can be applied. As MMSE considers the noise effect, MMSE will be more effective when heavy noise is involved, but under most usual operating conditions, noise is not a dominant factor, and its performance would be equal to that of ZF equalizer. Further, any other linear filter with an ultimate band-pass response provides a performance convergent to that of the ZF equalizer.

Solution of the System of Linear Equations

The characteristic matrix, K, in the system of linear equations in EQ. (7) transforms the two orthogonal displacement signals into N phase-delayed Hall sensors' signals. The EQ. (7) can be solved by finding the inverse of the characteristic matrix K.

Since K is not a square matrix (N×2), the inverse of K cannot be directly calculated; however, its pseudo-inverse $K^+$ exists with multiple solutions.

There are several methods of finding the pseudo-inverse of K such as Gaussian Elimination, Singular Value Decomposition (SVD), and Least Square Approximation. SVD decomposes the matrix K into left singular vectors (V) and right singular vectors (U), and a diagonal matrix ($\Sigma$), $K^+ = V\Sigma U^T$, from which the pseudo-inverse of K is calculated. Least Square Approximation minimizes the error $E = \|K^+ x - s\|$ in least square sense, and the pseudo-inverse of K is found by a formula, $K^+ = (K^T K)^{-1} K^T$, where $K^T$ denotes the transpose of K.

In this example, the pseudo-inverse $K^+$ for N=15 case is calculated in EQ. (10) by Least Square Approximation.

$$\begin{bmatrix} H_1 \text{sincoef}:S_1 = +0.1334 & H_1 \text{coscoef}:C_1 = +0.0000 \\ H_2 \text{sincoef}:S_2 = +0.1218 & H_2 \text{coscoef}:C_2 = -0.0543 \\ H_3 \text{sincoef}:S_3 = +0.0892 & H_3 \text{coscoef}:C_3 = -0.0991 \\ H_4 \text{sincoef}:S_4 = +0.0412 & H_4 \text{coscoef}:C_4 = -0.1268 \\ H_5 \text{sincoef}:S_5 = -0.0139 & H_5 \text{coscoef}:C_5 = -0.1326 \\ H_6 \text{sincoef}:S_6 = -0.0667 & H_6 \text{coscoef}:C_6 = -0.1155 \\ H_7 \text{sincoef}:S_7 = -0.1079 & H_7 \text{coscoef}:C_7 = -0.0784 \\ H_8 \text{sincoef}:S_8 = -0.1305 & H_8 \text{coscoef}:C_8 = -0.0277 \\ H_9 \text{sincoef}:S_9 = -0.1305 & H_9 \text{coscoef}:C_9 = +0.0277 \\ H_{10} \text{sincoef}:S_{10} = -0.1079 & H_{10} \text{coscoef}:C_{10} = +0.0784 \\ H_{11} \text{sincoef}:S_{11} = -0.0667 & H_{11} \text{coscoef}:C_{11} = +0.1155 \\ H_{12} \text{sincoef}:S_{12} = -0.0139 & H_{12} \text{coscoef}:C_{12} = +0.1326 \\ H_{13} \text{sincoef}:S_{13} = +0.0412 & H_{13} \text{coscoef}:C_{13} = +0.1268 \\ H_{14} \text{sincoef}:S_{14} = +0.0892 & H_{14} \text{coscoef}:C_{14} = +0.0991 \\ H_{15} \text{sincoef}:S_{15} = +0.1218 & H_{15} \text{coscoef}:C_{15} = +0.0543 \end{bmatrix} \quad \text{EQ. (10)}$$

By inserting EQ. (10) into EQ. (9), the synthesized orthogonal signal, $\sin(\theta)$ and $\cos(\theta)$, is expressed as the following linear transversal equalization form $$\begin{aligned} \sin(\theta) = &\ 0.1334*\sin(\theta-0)+0.1218*\sin(\theta-24)+ \\ &\ 0.0892*\sin(\theta-48)+0.0412*\sin(\theta-72)-0.0139*\sin \\ &\ (\theta-96)-0.0667*\sin(\theta-120)-0.1079*\sin(\theta-144)- \\ &\ 0.1305*\sin(\theta-168)-0.1305*\sin(\theta-192)- \\ &\ 0.1079*\sin(\theta-216)-0.0667*\sin(\theta-240)- \\ &\ 0.0319*\sin(\theta-264)+0.0412*\sin(\theta-288)+ \\ &\ 0.0892*\sin(\theta-312)+0.1218*\sin(\theta-336) \end{aligned} \quad \text{EQ. (11)}$$

$$\begin{aligned} \cos(\theta) = &\ 0.000*\sin(\theta-0)-0.0543*\sin(\theta-24)-0.0991*\sin \\ &\ (\theta-48)-0.1268*\sin(\theta-72)-0.1326*\sin(\theta-96)- \\ &\ 0.1155*\sin(\theta-120)-0.0784*\sin(\theta-144)- \\ &\ 0.0277*\sin(\theta-168)+0.0277*\sin(\theta-192)+ \\ &\ 0.0784*\sin(\theta-216)+0.1155*\sin(\theta-240)+ \\ &\ 0.1326*\sin(\theta-264)+0.1268*\sin(\theta-288)+ \\ &\ 0.0991*\sin(\theta-312)+0.0543*\sin(\theta-336) \end{aligned} \quad \text{EQ. (12)}$$

EQ. (11) and (12) show the ZF equalized and synthesis of 15 Hall sensors' signals is simply involved by 15 multiplications and additions for each $\sin(\theta)$ and its 90° shifted $\cos(\theta)$ signal.

The signal processing flow of applying ZF equalization in FIG. 6) is conveniently implemented by analog circuit using the operational amplifier (OP-amp) as shown in FIG. 7($a$) and FIG. 7($b$) for the $\sin(\theta)$ and $\cos(\theta)$ synthesis, respectively.

In FIG. 7($a$), the Hall sensor signal, of which corresponding sine filter coefficient is positive, is connected to positive signal processing OP-amp (US1) through a resistor whose resistance value represents the corresponding sine coefficient, and the negative coefficient Hall sensor signal is connected to negative signal processing OP-amp (US2) through a resistor whose resistance value represents the corresponding sine coefficient.

The positive signal processing OP-amp (US1) and negative signal processing OP-amp (US2) is connected through the coupling resistor (RL1). The input and output of OP-amp (US1) and OP-amp (US2) is connected by a negative feedback register (RF1) and (RF2), respectively.

Therefore, the positive coefficient Hall sensor signals are two stage amplified through feedback register RF1 and RF2, whereas negative coefficient Hall sensor signals are one stage amplified through feedback register RF2, which results in each register value being inversely proportional to the corresponding filter coefficient value.

Likewise for the $\cos(\theta)$ orthogonal signal processing of EQ. (12), an exemplary analog circuit realization is shown in FIG. 7($b$), where UC1 and UC2 is two stage amplified through negative feedback registers RF3 and RF4. Each coefficient register value is also inversely proportional to the corresponding filter coefficient value.

When RF1=RF2=RF3=RF4=RL1=RL2=RF and the input signal amplitudes are assumed to be equal, the amplification ratio between the input and output for each Hall sensor signal, $A_V$, can be simplified to $A_V$=RF/RS1, RF/RS2 . . . RF/RSn for $\sin(\theta)$ calculation in FIG. 7($a$) and $A_V$=RF/RC1, RF/RC2 . . . RF/RCn for $\cos(\theta)$ calculation in FIG. 7($b$).

It is noted that the analog circuit realization in FIGS. 7($a$) and ($b$) is designed to satisfy a desired property that each coefficient in EQ. (11) and EQ. (12), and corresponding coefficient register value in FIG. 7($a$) and FIG. 7($b$), and amplification ratio of each signal has an equal ratio relationship such that $A_V$=(Output-amplitude/Input-amplitude) =(RF/coefficient-register-value)=Coefficient in EQ. (11) and (12).

In other words, the amplitude amplification ratio of each Hall sensor signal is proportional to corresponding coefficient in EQ. (11) and (12), so that by simply changing the RF and RL value, the amplitude of the orthogonal signal can be adjusted to a desired level while maintaining correct relative gains among all coefficients in multiplication. This kind of OP-amp utilization technique is very useful in adjusting the orthogonal signal level without adjusting individual coefficient resistors especially when the number of Hall sensors employed is large and when it is required to adjust the synthesis gains accurately.

Simulation and Performance Evaluation of the ZF Equalizer

The performance of the ZF equalized synthesis method is evaluated by a proper simulation before implementation. It is logically expected that undistorted analog Hall sensors' signals would synthesize undistorted two orthogonal displacement signals. When fully distorted signals like square wave signals (50% duty cycle) in FIG. 5(c) are fed into the ZF equalizer, the synthesized two orthogonal displacement signals are stair step (or stepped) orthogonal displacement signals that are drawn as solid line in FIG. 8(a). The envelope of the two stair step (or stepped) signals exactly follows an ideal sine and cosine signal drawn as a dotted line.

To check the orthogonality of the two stepped orthogonal signals in FIG. 8(a), their Lissajous graph is shown in FIG. 8(b). For 50% duty cycle square wave signals, the Lissajous graph of two stepped orthogonal displacement signals show that the orthogonality is still perfectly held, but its shape is a 30-gon (2N-gon and N=15). The two orthogonal displacement signals can be fully reconstructed by an optimal band pass filtering of the two stepped orthogonal displacement signals.

The stepped sine or cosine orthogonal signal has 30 steps (2N, N=15) in one period, and their Lissajous graph has a 30-gon shape. The 50% duty cycle Hall sensor square wave signal is regarded as 1 bit digital signal of the digital Hall sensor. The fact that ZF equalization and synthesis response for 1 bit digital signal is a sampled and held signal (stepped sine and cosine signal) of an ideal orthogonal signal proves that ZF equalization by $K^+$ is the perfect and optimal orthogonal signal conversion without any loss or distortion for a given Hall sensors' displaced positions.

As the envelope of stepped two orthogonal displacement signals is an ideal sine and cosine signal, the 30 vertices of the Lissajous graph are on a precise circle. The 30-gon Lissajous graph from the 100% saturated square wave 15 Hall sensors' signals is the best orthogonal signal that can be achieved.

When somewhat distorted Hall sensor's sinusoidal signals in FIG. 5(b) are ZF equalized by EQ. (11) and EQ. (12), the orthogonal signal is very close to its ideal one as shown in FIG. 9(a), and their orthogonality is almost perfectly held as shown by their Lissajous graph in FIG. 9(b). The circular Lissajous graph confirms that distortions are substantially removed in the process of ZF equalized synthesis process.

The 2N-gon response for N square wave Hall sensors' signals serves as a key criterion in evaluating Hall sensor encoder performance, especially in the selection of the pseudo-inverse of K matrix in FIG. 3) design flow chart.

When N Hall sensors are not properly positioned or the solution of the system of linear equations is not optimal, the amplitude of 2N-gon would be smaller or its symmetry would be deformed.

Implementation of the ZF Equalized Absolute Encoder

The Hall sensor absolute encoder is implemented once the ZF equalization filter coefficients are determined from the disclosed simulation method.

Figure 10:
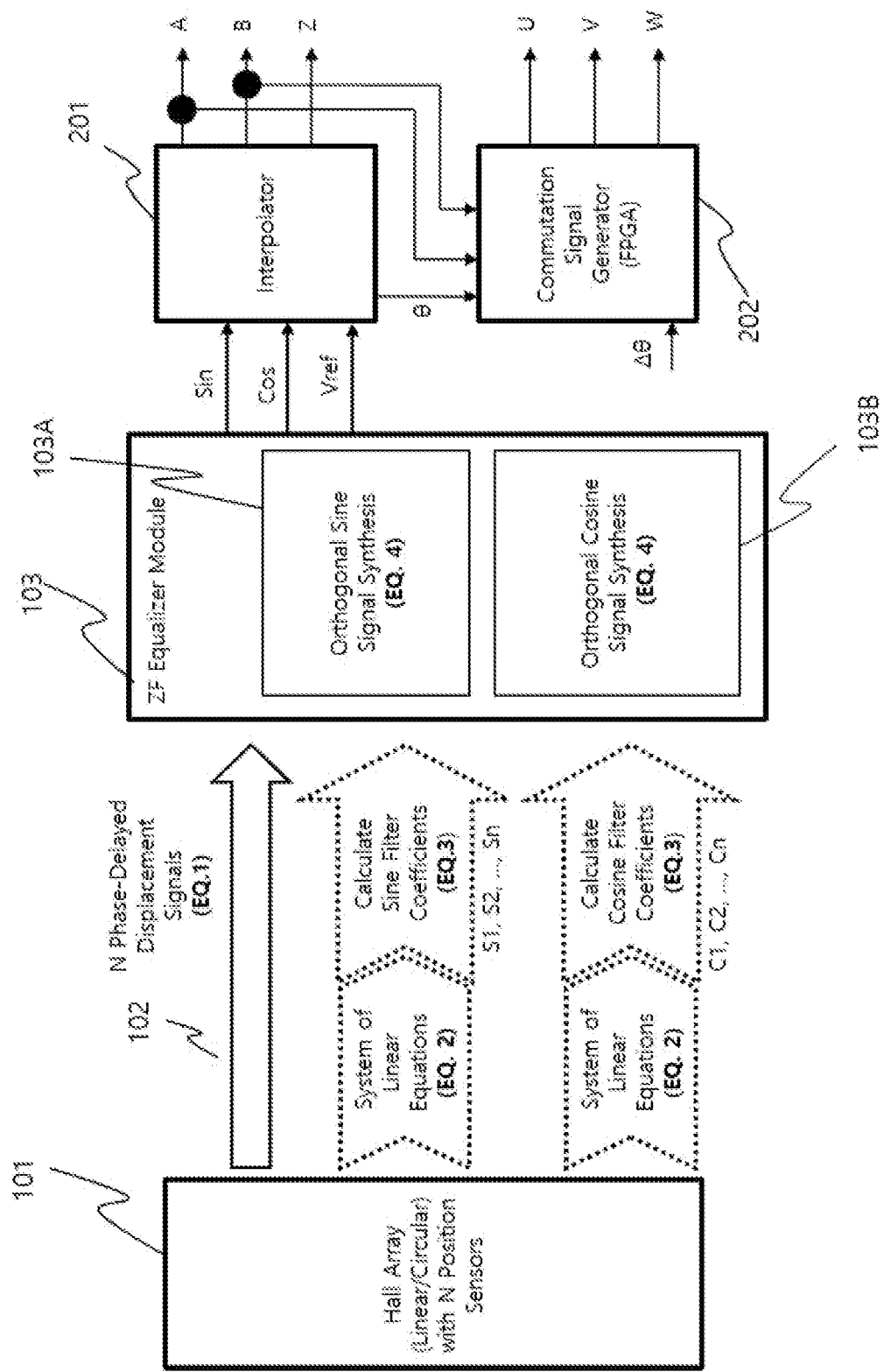
FIG. 10 illustrates an exemplary block diagram of ZF equalized Hall sensor encoder system.

Referring to FIG. 10, an overall block diagram of the ZF equalized Hall sensor encoder system is shown in accordance with the invention, where the Hall sensor signal is considered as an analog signal and the ZF equalization is implemented in analog circuits, namely, an analog Hall sensor encoder implemented by analog circuits.

The apparatus comprises Hall Array Block (101), ZF Equalizer Module (103), Interpolator (201), and may include Commutation Signal Generator (202) for BLDC motor.

The Hall Array Block (101) comprises Hall sensors ($H_1 \sim H_N$) placed over the N-S pole-pairs of rotor or stator in a linear or rotary encoder.

The ZF Equalizer Module (103) synthesizes the orthogonal signal from the Hall sensors' signals at Hall Array Block (101), and comprises the Sine and Cosine Orthogonal Synthesis Module, for which an exemplary circuit diagram is shown in FIGS. 7(a) and (b) for N=15 case, respectively.

For N Hall sensors, Orthogonal Sine and Cosine Synthesis Module (103A and 103B) comprises UC1 and UC2 OP-amp and each Module has N Sine coefficient resistors (RS1~RSn) and N Cosine coefficient resistors (RC1~RCn), each of which is connected to positive signal processing OP-amp (US1 or UC1) or negative signal processing OP-amp (US2 or UC2) depending on the sign of its coefficient. US2 (or UC2) also takes the output of US1 (or UC1) and amplifies the signal with an optimum gain to maintain the correct amplitude.

The commercially available Interpolator (201) takes the two orthogonal displacement signals $\sin(\theta)$ and $\cos(\theta)$ from the ZF Equalizer Module (103), and performs A/D conversion and calculates the absolute position ($\theta$) of encoder, and generates incremental position pulses, A, B, and Z phase signals. However, in order to generate commutation signals (U, V, and W) to actually control the motor in practical BLDC motors, Signal Generator (202) may be required that can be implemented by digital circuit such as Field Programmable Gate Array (FPGA).

Figure 11:
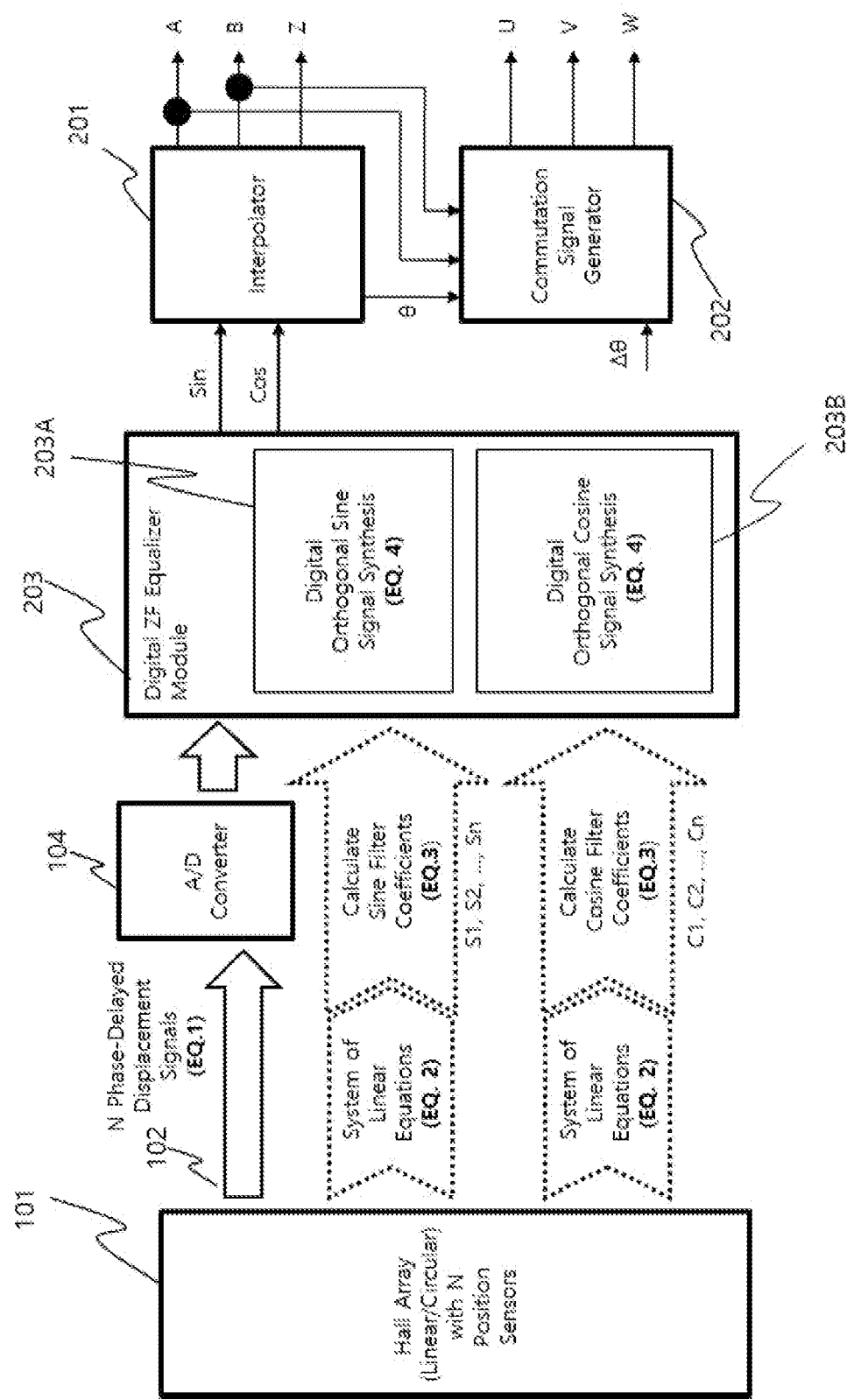
FIG. 11 illustrates an exemplary block diagram of digitally implemented ZF equalized Hall sensor encoder system.

Another exemplary circuit, referring to FIG. 11), is to process the ZF equalization in digital, where the Hall sensors' signals are directly A/D converted and ZF equalization is processed by digital processors including application-specific integrated circuit (ASIC). Several A/D converters may be necessary to process N Hall sensor analog signals to digital; however, the number of A/D converters can be reduced if A/D conversion is multiplexed by using high speed analog MUX.

A digitally integrated ZF equalized Hall sensor absolute encoder can integrate all or partial block of A/D Converter (104), Digital ZF Equalizer Module (203), Interpolator (201), and may also include Commutation Pulse Generator (202) for BLDC motor application. Owing to advance of digital design technology, integration of more blocks in digital processor will make a more efficient and compact encoder that is more immune to noise.

Generation of High Precision Commutation Signals for BLDC Motor

In FIG. 10 and FIG. 11, BLDC motor Commutation Signals are usually generated after measuring the absolute position of the encoder; however, for some cases the Hall encoder system may be required to generate 3 phase synchronous encoder compatible signals or commutation pulses (U, V, and W).

In this case, as shown in FIG. 12), 3 phase synchronous encoder compatible signals— $\sin(\theta)$, $\sin(\theta\text{-}120)$, and $\sin(\theta\text{-}240)$—can be generated from the ZF equalizer module directly. Sin(θ-120) and sin(θ-240) phase signals are simply generated by taking 120° and 240° shifted synthesis input at Sine ZF equalization and synthesis circuit as illustrated in FIGS. 13(*a*) and (*b*), respectively.

By generating 3-phase Commutation Signals through the process of ZF equalization, more accurate signals are generated while achieving all ZF equalization performances, which results in smooth BLDC motor operation at its maximum rated torque.

ZF Equalization of Digital Hall Sensor Signal

The digital Hall sensor that produces a square or quasi-square digital signal, value of 0 or 1 state, is immune to noise since the output signal is regarded only as 0 or 1 state, and can be advantageous for applications in harsh and noisy operating environments.

A practical digital Hall sensor produces about 50% duty cycle square wave signal; 0 or 1 state upon the N-S magnetic flux cycles with some portion of rising and falling time at each transition edge. As was observed and discussed earlier, when square wave signals are input to ZF equalizer, the two orthogonal displacement signals synthesized by the ZF equalizer are stepped sin(θ) and cos(θ) signal as shown in FIG. 13(*c*). The Lissajous graph of the stepped orthogonal displacement signals is a 2N-gon when N digital Hall sensors are employed.

The error signal, the difference between the perfect circle and 2N-gon, however, is static and pre-determined, and can be compensated in the interpolation process so as to obtain the accurate absolute displacement position θ. As 2N-gon and perfect circle is known a priori, the error signal (Δθ) is pre-calculated over the Lissajous circle by piecewise approximation and can be stored in a look-up table to compensate the raw position error of the encoder.

The ZF equalization of the digital Hall sensor encoder, together with its accurate error signal (Δθ) compensation technique, is very useful to the design of a robust Hall sensor encoder, especially when a smaller number of sensors is operated under noisy environments.

Encoder Index Pulse Generation

The ZF equalized encoder also provides a capability of conveniently generating an Index pulse, the Z-phase signal. The Index pulse is regarded as a phase-delayed signal of the orthogonal sin(θ) signal. FIG. 13(*d*) shows a block diagram of generating the Index pulse, sin(θ-Δθ), from the orthogonal signal for a desired AO phase delay.

By applying sine addition formula, sin(θ-Δθ)=sin(θ)*cos(Δθ)−cos(θ)*sin(Δθ)=KS*sin(θ)+KC*cos(θ), where KS=cos(Δθ) and KC=−sin(Δθ). Since KS and KC is a constant, any desired index pulse is easily and accurately generated including commutation pulses of 120° and 240° delayed signals. Index pulses are useful for synchronization with peripheral devices as well as in generation of homing, origin, signals in practical applications.

Application to Resolvers, Inductive Encoders, and Capacitive Encoders

The ZF equalizer modeling to Hall sensor encoders to improve their absolute position detection performance can also be applied to resolvers, inductive encoders, capacitive encoders, or any other electro-magnetic displacement measuring apparatus as far as N sequentially phase-delayed displacement signals over a certain electrical cycle are generated.

Referring to FIG. 13(*e*), an exemplary ZF equalizer application to 5-phase resolver is shown. Instead of sin(θ) and cos(θ) windings in a typical resolver, L0, L72, L144, L216, L288 stator windings are added. As the rotor being displaced, 5 modulated phase-delayed displacement signals are generated from 5 windings. The 5 modulated phase-delayed displacement signals are demodulated, and are processed by the ZF equalizer to produce the two orthogonal displacement signals. These 5 demodulated signals can be regarded as 5 Hall sensors' signals. Owing to the optimal transformation property of ZF equalizer (103), a much-improved two orthogonal displacement signals can be obtained.

Referring to FIG. 13(*f*), an exemplary ZF equalizer application to 5-phase inductive encoder is shown. Unlike a typical inductive encoder, stator driving coil and 5 stator sensing coils (L0, L72, L144, L216, L288) that can be easily and compactly implemented on the printed circuit board (PCB) are made. When high frequency voltage excitation source is applied to stator driving coil, 5 modulated phase-delayed displacement signals are generated on 5 stator sensing coils as N-S displacement of the rotor changes. The generated 5 modulated phase-delayed displacement signals are demodulated, and are processed by the ZF equalizer (103) to obtain much improved two orthogonal displacement signals.

Referring to FIG. 13(*g*), an exemplary ZF equalizer application to 5-phase capacitive encoder is shown, in which stator electrode PCB and rotor electrode PCB rotate around a fixed axis. When high frequency voltage excitation source, sin(ωt), is applied to stator electrode PCB, an electric field is generated between stator electrode PCB and rotor electrode PCB. Specific 5 capacitive patterns (C0, C72, C144, C216, C288) are drawn on rotor electrode PCB. The capacitive pattern, C0, C72, C144, C216, C288, reacts as a variable capacitor in response to change in displacement of a formed electric field, from which 5 modulated and phase-delayed) sin(θ-0°), sin(θ-72°), sin(θ-144°), sin(θ-216°), sin(θ-288°) signals are generated. These modulated and phase-delayed sinusoidal signals are demodulated, and processed by the ZF equalizer (103) in accordance with the invention. Therefore, much-improved two orthogonal displacement signals are obtained rather than when the orthogonal signals are obtained by two phase, sin(θ) and cos(θ), signals directly from the rotor electrode.

Application to Optical Encoders

In previous sections, the ZF equalization modeling is applied to N phase-delayed displacement signals of electro-magnetic position sensors in obtaining the optimal two orthogonal displacement signals. The ZF equalization concept can also be applied to optical encoders to improve their absolute position sensing performance.

FIG. 14(*a*) illustrates an operational principle of a typical digital optical encoder, where optical encoder disk wheel has three tracks, A-phase, B-phase, and Z-phase. On rotating wheel, A-phase and B-phase markings are engraved around the whole circle with 90° phase shift and Z-phase marking is engraved so as to produce only one pulse per turn. Light excitation sources and photo sensors read the optical pattern of A, B, Z-phase signals, and the output of photo detector is connected to Schmitt Trigger to produce a digital pulse signal.

Analog optical encoders, generating two orthogonal displacement signals, sin(θ) and cos(θ), are also widely used; however, to achieve high precision, it still needs to overcome technical challenges, such as, light excitation source, photo sensor, and optical processing issues inherently existing in optical encoder.

An exemplary ZF equalizer application to optical analog encoder is shown in FIG. 14(*b*), where the disk wheel has 5 tracks of markings and each adjacent track is made to be 72° (360°/5) phase-delayed such that from the outermost track to the innermost track generates sin(θ), sin(θ-72°), sin(θ-144°), sin(θ-216°), sin(θ-288° signal. As the disk wheel rotates, receiving photo-sensors generate 5 phase-delayed sinusoidal signals, and these signals are fed into ZF equalizer to produce much improved two orthogonal displacement signals.

Another example of ZF equalizer application to optical encoder is shown in FIG. 14(c), where the disk wheel has one track of markings and photo-sensor locations are shifted to generate sin(θ), sin(θ-72), sin(θ-144), sin(θ-216), and sin(θ-288) signals. As shown in the figure, when the space between each marking is defined as one period of 360°, sin(θ), sin(θ-72°), sin(θ-144°), sin(θ-216°), and sin(θ-288°) photosensor is located at the 0°, 72°, 144°, 216°, and 288° positions, respectively. These detected 5 phase-delayed sinusoidal signals are ZF equalized, and from which much improved two orthogonal displacement signals are obtained.

Exemplary Realization

To confirm the theoretical and simulation results presented in previous sections, the ZF equalized vector synthesis analog Hall sensor encoder is fabricated on commercially available 10 pole-pairs BDLC motor with 130 mm radius. Over 10 magnetic pole-pairs, 25 Hall sensors are evenly positioned, therefore, 25 phase-delayed sinusoidal displacement signals, each of which is sequentially 14.4° delayed, are generated.

The system of linear equations in EQ. (2) is rewritten for N=25 case as follows:

$$\begin{bmatrix} H1\ out \\ H2\ out \\ H3\ out \\ H4\ out \\ H5\ out \\ H6\ out \\ H7\ out \\ H8\ out \\ H9\ out \\ H10\ out \\ H11\ out \\ H12\ out \\ H13\ out \\ H14\ out \\ H15\ out \\ H16\ out \\ H17\ out \\ H18\ out \\ H19\ out \\ H20\ out \\ H21\ out \\ H22\ out \\ H23\ out \\ H24\ out \\ H25\ out \end{bmatrix} = \begin{bmatrix} Sin(\theta - 0.0) \\ Sin(\theta - 14.4) \\ Sin(\theta - 28.8) \\ Sin(\theta - 43.2) \\ Sin(\theta - 57.6) \\ Sin(\theta - 72.0) \\ Sin(\theta - 86.4) \\ Sin(\theta - 100.8) \\ Sin(\theta - 115.2) \\ Sin(\theta - 129.6) \\ Sin(\theta - 144.0) \\ Sin(\theta - 158.4) \\ Sin(\theta - 172.8) \\ Sin(\theta - 187.2) \\ Sin(\theta - 201.6) \\ Sin(\theta - 216.0) \\ Sin(\theta - 230.4) \\ Sin(\theta - 244.8) \\ Sin(\theta - 259.2) \\ Sin(\theta - 273.6) \\ Sin(\theta - 288.0) \\ Sin(\theta - 302.4) \\ Sin(\theta - 316.8) \\ Sin(\theta - 331.2) \\ Sin(\theta - 345.6) \end{bmatrix} = $$

EQ. (13)

$$\begin{bmatrix} 1 & 0 \\ 0.968583174 & -0.248689837 \\ 0.876306730 & -0.481753582 \\ 0.728968735 & -0.684546992 \\ 0.535826972 & -0.844327813 \\ 0.309017243 & -0.951056436 \\ 0.062790833 & -0.998026709 \\ -0.187380955 & -0.982287319 \\ -0.425778913 & -0.904827231 \\ -0.637423627 & -0.770513543 \\ -0.809016687 & -0.587785675 \\ -0.929776274 & -0.368125087 \\ -0.992114623 & -0.125333856 \\ -0.992114787 & 0.125332559 \\ -0.929776755 & 0.368123872 \\ -0.809017455 & 0.587784618 \\ -0.637424634 & 0.770512710 \\ -0.425780096 & 0.904826674 \\ -0.187382239 & 0.982287074 \\ 0.062789528 & 0.998026791 \\ 0.309016000 & 0.951056839 \\ 0.535825868 & 0.844328514 \\ 0.728967840 & 0.684547944 \\ 0.876306101 & 0.481754728 \\ 0.968582849 & 0.248691103 \end{bmatrix} * \begin{bmatrix} Sin(\theta) \\ Cos(\theta) \end{bmatrix}$$

The solution of the system of linear equations, the pseudo-inverse of characteristic matrix K, provides ZF equalization coefficients, and the two orthogonal displacement signals, sin(θ) and cos(θ), are calculated as follows:

Sin(θ)=0.0800*sin(θ-0)+0.0775*sin(θ-14.4)+
0.0701*sin(θ-28.8)+0.0583*sin(θ-43.2)+
0.0429*sin(θ-57.6)+0.0247*sin(θ-72)+
0.0050*sin(θ-86.4)−0.0150*sin(θ-100.8)−
0.0341*sin(θ-115.2)−0.0510*sin(θ-129.6)−
0.0647*sin(θ-144)−0.0744*sin(θ-158.4)−
0.0794*sin(θ-172.8)−0.0794*sin(θ-187.2)−
0.0744*sin(θ-201.6)−0.0647*sin(θ-216)−
0.0510*sin(θ-230.4)−0.0341*sin(θ-244.8)−
0.0150*sin(θ-259.2)+0.0050*sin(θ-273.6)+
0.0247*sin(θ-288)+0.0429*sin(θ-302.4)+
0.0583*sin(θ-316.8)+0.0701*sin(θ-331.2)+
0.0775*sin(θ-345.6)    EQ. (14)

Cos(θ)=0.0*sin(θ-0)−0.0199*sin(θ-14.4)−0.0385*sin(θ-28.8)−0.0548*sin(θ-43.2)−0.0675*sin(θ-57.6)−0.0761*sin(θ-72)−0.0798* sin(θ-86.4)−
0.0786*sin(θ-100.8)−0.0724*sin(θ-115.2)−
0.0616*sin(θ-129.6)−0.0470*sin(θ-144)−
0.0295*sin(θ-158.4)−0.0100*sin(θ-172.8)+
0.0100*sin(θ-187.2)+0.0294*sin(θ-201.6)+
0.0470*sin(θ-216)+0.0616*sin(θ-230.4)+
0.0724*sin(θ-244.8)+0.0786*sin(θ-259.2)+
0.0798*sin(θ-273.6)+0.0761*sin(θ-288)+
0.0675*sin(θ-302.4)+0.0548*sin(θ-316.8)+
0.0385*sin(θ-331.2)+0.0199*sin(θ-345.6)    EQ. (15)

To evaluate the performance of EQ. (14) and EQ. (15), namely, 25-taps (N=25) ZF equalizer performance, 50% duty cycle square wave Hall sensors' signals are applied.

The simulation results are shown in FIGS. 15(a) and (b) for the two orthogonal displacement signals, sin(θ) and cos(θ), the waveform and their Lissajous graph, respectively. As expected, the two orthogonal displacement signals, sin(θ) and cos(θ) are stepped sinusoidal signals with 50 steps in one period, and the Lissajous graph is a 50-gon shape.

Comparing with N=15 case in FIG. 8(a) and FIG. 8(b), the two stepped orthogonal displacement signals in FIG. 15(a) and their Lissajous graph in FIG. 15(b) are substantially closer to the precise sine and cosine signal and to a fine circle, respectively.

It is confirmed that the exemplary realized 10 magnetic pole-pairs 25-Hall sensors' encoder with refine assembling operates at 12 bits to 16 bits of resolution without any issues or problems by incorporating the ZF equalized vector synthesis of 25 Hall sensors' signals.

FIG. 16(a) shows a raw Hall sensor sinusoidal signal captured on an oscilloscope from an exemplary realized 10 pole-pairs 25-Hall sensors' encoder, where it is seen that the signal is much distorted.

FIG. 16(b) shows a captured Lissajous graph on an oscilloscope with 10:1 probe when the two orthogonal displacement signals are directly taken from 2 Hall sensors in FIG. 16(a) without ZF equalization synthesis. Its shape is far from a circle that is not applicable to get any meaningful absolute position information.

On the other hand, FIG. 16(c) shows a captured Lissajous graph on an oscilloscope when the two orthogonal displacement signals are obtained from the realized ZF equalized 25-Hall sensors' encoder, of which shape is close to a pure circle, from which precise absolute position information can be obtained. The performance of a refined 25-Hall sensors' encoder system is as good as that of typical optical encoder's: higher than 16 bits of resolution over one electric cycle can be achieved.

While the initial development and the production cost for high-precision resolvers or optical encoders is high, ZF equalized Hall sensor encoders can be built and produced at a much lower cost for high-precision applications in areas where conventional resolvers or optical encoders have been used.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A Zero-Force Equalized Vector Synthesis Absolute Encoder method for obtaining two orthogonal displacement signals in an encoder, the method comprising:

(a) N position sensors ($H_1$~$H_N$) are positioned on a rotor (or a stator) at certain phase angle positions partitioned over one or more periods of electrical angle of the encoder, wherein the encoder has at least one electrical angle period caused by excitation source through one mechanical cycle, wherein N is an integer greater than or equal to 4;

(b) each of the N position sensors detects a displacement signal corresponding to its positioned phase angle as the rotor (or the stator) moves linearly (or circularly), wherein the N position sensor displacement signals are N sequentially phase-delayed displacement signals as shown in [EQ. 1];

(c) the N sequentially phase-delayed displacement signals are decomposed into their orthogonal signal vector (x) by applying a sine formula, wherein a system of linear equations is formed based on Zero-Forcing (ZF) equalization principle that a sum of all other tap's signals other than own tap's signal is forced to be zero at each tap, wherein a matrix equation h=Kx is set up as shown in [EQ. 2], wherein K is a characteristic matrix connecting between the signals of N position sensors h with their corresponding orthogonal displacement signal vector x;

(d) the orthogonal displacement signal vector x is synthesized from the signals of N position sensors h by solving the system of linear equations through inverse transform, as shown in [EQ. 3] by applying a pseudo-inverse $K^+$ to h, wherein $K^+$ has one or more solutions and a best solution is determined from the one or more solutions;

(e) the pseudo-inverse $K^+$ is 2×N matrix, of which a first row constitutes sine coefficients ($S_1, S_2, S_3, \ldots, S_N$) and a second row constitutes cosine coefficients ($C_1, C_2, C_3, \ldots, C_N$) for an orthogonal sin(θ) and cos(θ) signal synthesis, respectively, wherein ZF equalization linear transversal filtering in [EQ. 4] is applied to the displacement signals of the N position sensors ($H_1$~$H_N$);

(f) a precise absolute displacement position of the rotor (or the stator) is determined by the synthesized orthogonal displacement signals (sin(θ) and its 90° phase-shifted cos(θ)) as shown in [EQ. 4], wherein the synthesized orthogonal displacement signals have their optimal amplitude and phase by minimizing distortions of raw position sensor signals in ZF equalization process $$H_{1out} = \mathrm{Sin}(\theta - 0), \quad [\text{EQ. 1}]$$
$$H_{2out} = \mathrm{Sin}\left(\theta - \frac{360}{N} \times 1\right),$$
$$H_{3out} = \mathrm{Sin}\left(\theta - \frac{360}{N} \times 2\right), \ldots H_{Nout} = \mathrm{Sin}\left(\theta - \frac{360}{N} \times (N-1)\right)$$

$$h = \begin{bmatrix} H_{1out} \\ H_{2out} \\ H_{3out} \\ \vdots \\ H_{Nout} \end{bmatrix} = \begin{bmatrix} \mathrm{Sin}(\theta - 0) \\ \mathrm{Sin}\left(\theta - \frac{360}{N} \times 1\right) \\ \mathrm{Sin}\left(\theta - \frac{360}{N} \times 2\right) \\ \vdots \\ \mathrm{Sin}\left(\theta - \frac{360}{N} \times (N-1)\right) \end{bmatrix} = \quad [\text{EQ. 2}]$$

$$\begin{bmatrix} \mathrm{Cos}(0) & -\mathrm{Sin}(0) \\ \mathrm{Cos}\left(\frac{360}{N} \times 1\right) & -\mathrm{Sin}\left(\frac{360}{N} \times 1\right) \\ \mathrm{Cos}\left(\frac{360}{N} \times 2\right) & -\mathrm{Sin}\left(\frac{360}{N} \times 2\right) \\ \vdots & \vdots \\ \mathrm{Cos}\left(\frac{360}{N} \times (N-1)\right) & -\mathrm{Sin}\left(\frac{360}{N} \times (N-1)\right) \end{bmatrix} * \begin{bmatrix} \mathrm{Sin}(\theta) \\ \mathrm{Cos}(\theta) \end{bmatrix} =$$

$$Kx$$

-continued $$x = \begin{bmatrix} \mathrm{Sin}(\theta) \\ \mathrm{Cos}(\theta) \end{bmatrix} = K^+ \begin{bmatrix} H_{1out} \\ H_{2out} \\ H_{3out} \\ \vdots \\ H_{Nout} \end{bmatrix} = K^+ \begin{bmatrix} \mathrm{Sin}(\theta - 0) \\ \mathrm{Sin}\left(\theta - \frac{360}{N} \times 1\right) \\ \mathrm{Sin}\left(\theta - \frac{360}{N} \times 2\right) \\ \vdots \\ \vdots \\ \mathrm{Sin}\left(\theta - \frac{360}{N} \times (N-1)\right) \end{bmatrix} = = \quad [\text{EQ. 3}]$$

$$\begin{bmatrix} S_1 & S_2 & S_3 & \cdots & S_N \\ C_1 & C_2 & C_3 & \cdots & C_N \end{bmatrix} \begin{bmatrix} \mathrm{Sin}(\theta - 0) \\ \mathrm{Sin}\left(\theta - \frac{360}{N} \times 1\right) \\ \mathrm{Sin}\left(\theta - \frac{360}{N} \times 2\right) \\ \vdots \\ \vdots \\ \mathrm{Sin}\left(\theta - \frac{360}{N} \times (N-1)\right) \end{bmatrix}$$

$$\mathrm{Sin}(\theta) = S_1 \mathrm{Sin}(\theta - 0) + S_2 \mathrm{Sin}\left(\theta - \frac{360}{N} \times 1\right) + \quad [\text{EQ. 4}]$$
$$S_3 \mathrm{Sin}\left(\theta - \frac{360}{N} \times 2\right) + \cdots + S_N \mathrm{Sin}\left(\theta - \frac{360}{N} \times (N-1)\right)$$
$$\mathrm{Cos}(\theta) = C_1 \mathrm{Sin}(\theta - 0) + C_2 \mathrm{Sin}\left(\theta - \frac{360}{N} \times 1\right) +$$
$$C_3 \mathrm{Sin}\left(\theta - \frac{360}{N} \times 2\right) + \cdots + C_N \mathrm{Sin}\left(\theta - \frac{360}{N} \times (N-1)\right).$$

2. The method according to claim 1, wherein the pseudo-inverse $K^+$ for inverse transformation is calculated using Gaussian Elimination, Singular Value Decomposition, or Least Square Approximation, wherein a best solution among the various possible solutions is determined by utilizing a simulation, wherein a Lissajous graph of orthogonal signals is drawn for square wave input signals of 50% duty cycle, and the expected Lissajous graph of the best solution is to be closest to 2N-gon when N position sensors are employed.

3. The method according to claim 1, wherein a solution of the system of linear equations is solved by minimum-mean-square-error (MMSE) criterion.

4. A Zero-Force Equalized Absolute Encoder apparatus for obtaining two orthogonal displacement signals, the apparatus comprising:
a sensing module, the sensing module comprising N position sensors positioned on a rotor (or a stator) at certain phase angle positions partitioned over one or more electrical angle periods of a linear or rotary encoder, wherein the encoder has at least one electrical angle period caused by excitation source through one mechanical cycle, wherein the excitation source is a magnetic, electrostatic, electromagnetic, magnetoresistive, or optical source, wherein N is an integer greater than or equal to 4,
wherein the N position sensors detect N sequentially phase-delayed displacement signals ($H_{1out}$~$H_{Nout}$) that are expressed by single sinusoidal signals as shown in [EQ. 1];

a Zero-Forcing (ZF) equalizer, the Zero-Forcing (ZF) equalizer comprising of two linear transversal filters takes the N sequentially phase-delayed displacement signals ($H_{1out}$~$H_{Nout}$) and synthesizes two orthogonal displacement signals of $\sin(\theta)$ and $\cos(\theta)$ independently as shown in [EQ. 4], wherein signal components other than $\sin(\theta)$ and $\cos(\theta)$ signal are eliminated by forcing the sum of all tap's signals other than own tap to be zero at each tap, wherein ZF equalizer filter coefficients are determined by taking the inverse matrix of K, $K^+$ as shown in [EQ. 3], wherein the filter coefficients for $\sin(\theta)$ and $\cos(\theta)$ synthesis are denoted as ($S_1$, $S_2$, $S_3$, ..., $S_N$) and ($C_1$, $C_2$, $C_3$, ..., $C_N$), respectively, wherein the characteristic matrix K is a system of linear equations, connecting the N sequentially phase-delayed signals and the two orthogonal signals, as shown in [EQ. 2], wherein a precise absolute displacement position of the rotor (or the stator) is determined by the two orthogonal displacement signals obtained from the apparatus as shown in EQ. [4], wherein noise and distortion induced in the raw signals of position sensors are minimized $$H_{1out} = \mathrm{Sin}(\theta - 0), \quad [\text{EQ. 1}]$$
$$H_{2out} = \mathrm{Sin}\left(\theta - \frac{360}{N} \times 1\right),$$
$$H_{3out} = \mathrm{Sin}\left(\theta - \frac{360}{N} \times 2\right), .. H_{Nout} = \mathrm{Sin}\left(\theta - \frac{360}{N} \times (N-1)\right)$$

$$h = \begin{bmatrix} H_{1out} \\ H_{2out} \\ H_{3out} \\ \vdots \\ \vdots \\ H_{Nout} \end{bmatrix} = \begin{bmatrix} \mathrm{Sin}(\theta - 0) \\ \mathrm{Sin}\left(\theta - \frac{360}{N} \times 1\right) \\ \mathrm{Sin}\left(\theta - \frac{360}{N} \times 2\right) \\ \vdots \\ \vdots \\ \mathrm{Sin}\left(\theta - \frac{360}{N} \times (N-1)\right) \end{bmatrix} = \quad [\text{EQ. 2}]$$

$$\begin{bmatrix} \mathrm{Cos}(0) & -\mathrm{Sin}(0) \\ \mathrm{Cos}\left(\frac{360}{N} \times 1\right) & -\mathrm{Sin}\left(\frac{360}{N} \times 1\right) \\ \mathrm{Cos}\left(\frac{360}{N} \times 2\right) & -\mathrm{Sin}\left(\frac{360}{N} \times 2\right) \\ \vdots & \vdots \\ \vdots & \vdots \\ \mathrm{Cos}\left(\frac{360}{N} \times (N-1)\right) & -\mathrm{Sin}\left(\frac{360}{N} \times (N-1)\right) \end{bmatrix} * \begin{bmatrix} \mathrm{Sin}(\theta) \\ \mathrm{Cos}(\theta) \end{bmatrix} =$$

$$Kx$$

$$x = \begin{bmatrix} \sin(\theta) \\ \cos(\theta) \end{bmatrix} = K^+ \begin{bmatrix} H_{1out} \\ H_{2out} \\ H_{3out} \\ \vdots \\ H_{Nout} \end{bmatrix} = K^+ \begin{bmatrix} \sin(\theta - 0) \\ \sin\left(\theta - \frac{360}{N} \times 1\right) \\ \sin\left(\theta - \frac{360}{N} \times 2\right) \\ \vdots \\ \sin\left(\theta - \frac{360}{N} \times (N-1)\right) \end{bmatrix} == \quad [\text{EQ. 3}]$$

$$\begin{bmatrix} S_1 & S_2 & S_3 & \cdots & S_N \\ C_1 & C_2 & C_3 & \cdots & C_N \end{bmatrix} \begin{bmatrix} \sin(\theta - 0) \\ \sin\left(\theta - \frac{360}{N} \times 1\right) \\ \sin\left(\theta - \frac{360}{N} \times 2\right) \\ \vdots \\ \sin\left(\theta - \frac{360}{N} \times (N-1)\right) \end{bmatrix}$$

$$\sin(\theta) = S_1 \sin(\theta - 0) + S_2 \sin\left(\theta - \frac{360}{N} \times 1\right) + \quad [\text{EQ. 4}]$$
$$S_3 \sin\left(\theta - \frac{360}{N} \times 2\right) + \cdots + S_N \sin\left(\theta - \frac{360}{N} \times (N-1)\right)$$
$$\cos(\theta) = C_1 \sin(\theta - 0) + C_2 \sin\left(\theta - \frac{360}{N} \times 1\right) +$$
$$C_3 \sin\left(\theta - \frac{360}{N} \times 2\right) + \cdots + C_N \sin\left(\theta - \frac{360}{N} \times (N-1)\right).$$

5. The apparatus according to claim 4, wherein the Zero-Forcing (ZF) equalizer is implemented using operational-amplifier (OP-amp) in analog circuits, wherein the apparatus is further comprising:

two sets of N resistors, ($RS_1$, $RS_2$, $RS_3$, ..., $RS_N$) and ($RC_1$, $RC_2$, $RC_3$, ..., $RC_N$) corresponding to the ($S_1$, $S_2$, $S_3$, ..., $S_N$) and ($C_1$, $C_2$, $C_3$, ..., $C_N$) filter coefficients, respectively, wherein each set of N resistors takes the N phase-delayed displacement signals as input signals, wherein for the $\sin(\theta)$ synthesis, the output signals of ($RS_1$, $RS_2$, $RS_3$, ..., $RS_N$) resistors, whose corresponding coefficients are positive, are connected to +OP-amp (US1), and negative coefficient ones are connected to −OP-amp (US2), where +OP-amp (US1) and −OP-amp (US2) are connected through coupling resistor (RL1), wherein for the $\cos(\theta)$ synthesis, the output signals of ($RC_1$, $RC_2$, $RC_3$, ..., $RC_N$) resistors, whose corresponding coefficients are positive, are connected to +OP-amp (UC1), and negative coefficient ones are connected to −OP-amp (UC2), where +OP-amp (UC1) and −OP-amp (UC2) is connected through coupling resistor (RL2), wherein between the input and output of each OP-amp US1, US2, UC1, and UC2, a feedback register RF1, RF2, RF3, and RF4 is connected, respectively, wherein positive coefficient signals are two stage amplified through feedback registers RF1 and RF2 for $\sin(\theta)$ synthesis and RF3 and RF4 for $\cos(\theta)$ synthesis, wherein negative coefficient signals are one stage amplified through feedback register RF2 for $\sin(\theta)$ synthesis and RF4 for $\cos(\theta)$ synthesis, respectively.

6. The apparatus according to claim 5, wherein each resistor value of the ($RS_1$, $RS_2$, $RS_3$, ..., $RS_N$) and ($RC_1$, $RC_2$, $RC_3$, ..., $RC_N$) resistors is set as a ratio of a feedback gain register value to the corresponding filter coefficient, wherein a feedback gain register refers to (RF1), (RF2), (RF3), or (RF4) for OP-amp (US1), (US2), (UC1), or (UC2), respectively, to which each corresponding resister is connected;

wherein the value of each feedback gain register is kept the same as that of coupling resistor, RF1=RF2=RL1 and RF3=RF4=RL2 so that US2 outputs V sin ($\theta$), which has an optimal amplitude and phase of absolute position, while UC2 outputs V cos ($\theta$), which is maximally orthogonal to V sin ($\theta$).

7. The apparatus according to claim 4, wherein the N sequentially phase-delayed displacement signals are A/D converted, wherein an A/D converter and the ZF equalizer is implemented by a digital processor in digital circuit to improve noise immunity and signal integrity, wherein the ($S_1$, $S_2$, $S_3$, ..., $S_N$) and ($C_1$, $C_2$, $C_3$, ..., $C_N$) filter coefficients are stored in the digital processor and multiplication and addition is performed in digital circuit, thereby the resultant two orthogonal displacement signals, V sin ($\theta$) and V cos ($\theta$), are digital data;

wherein the apparatus further comprises an Interpolator and a Commutation Pulse Generator which are integrated into the digital processor for a more compact or efficient implementation.

8. The apparatus according to claim 4, wherein 3 phase synchronous displacement signals are directly and more precisely generated from the ZF equalizer, and Schmitt Trigger is connected at the output stage to generate commutation pulses (U, V, and W), wherein the apparatus further comprises a Commutation Pulse Generator, wherein the Commutation Pulse Generator generates:

U signal, $\sin(\theta)$, in the same way for orthogonal $\sin(\theta)$ calculation from default ZF equalizer output;

V signal, $\sin(\theta-120)$, from the default ZF equalizer output after shifting all position sensors' signals by 120°, W signal, $\sin(\theta-240)$, from the default ZF equalizer output after shifting all position sensors' signals by 240°.

9. The apparatus according to claim 4, wherein the position sensors generate square or quasi-square wave signals having 0 or 1 state, wherein the two orthogonal displacement signals, $\sin(\theta)$ and $\cos(\theta)$, synthesized by the ZF equalizer are stepped $\sin(\theta)$ and $\cos(\theta)$ signals with 2N steps in one period, when N digital position sensors are employed, wherein a Lissajous graph of the stepped two orthogonal displacement signals has a 2N-gon shape when N digital position sensors are employed, wherein an error between the 2N-gon shape and a perfect circle is pre-determined and compensated to obtain two accurate orthogonal displacement signals.

10. The apparatus according to claim 4, wherein index pulse (Z-phase signal) is directly obtained from the ZF equalizer, wherein the apparatus further comprises a Z-phase signal generator, wherein an index signal $\sin(\theta-\Delta\theta)$ is generated by multiplying KS and KC constant to the two orthogonal displacement signals from the ZF equalizer, $\sin(\theta)$ and $\cos(\theta)$, respectively, wherein KS=$\cos(\Delta\theta)$ and KC=$-\sin(\Delta\theta)$ when sine expansion formula, $\sin(\theta-\Delta\theta)=\sin(\theta)*\cos(\Delta\theta)-\cos(\theta)*\sin(\Delta\theta)$, is applied.

11. The apparatus according to claim 4, wherein optical position sensors are used, wherein the sensing module comprises one of the following two embodiments:
   a wheel disk having N levels of tracks, wherein N tracks are marked such that signals of N photo sensors detected from N tracks constitute N sequentially phase-delayed displacement signals, wherein ZF equalization is applied to synthesize the two orthogonal displacement signals,
   a wheel disk has one level track, on which N types of markings are designed such that signals of N photo sensors detected from N markings constitute N sequentially phase-delayed displacement signals, wherein ZF equalization is applied to synthesize the two orthogonal displacement signals.

12. The apparatus according to claim 4, wherein N coil-wirings of a resolver are employed as position sensors,
   wherein N coil-wirings are wired in a resolver such that N modulated and sequentially phase-delayed displacement signals sensed on N coil-wirings are demodulated, then N phase-delayed displacement signals are generated, wherein ZF equalization is applied to synthesize the two orthogonal displacement signals.

13. The apparatus according to claim 4, wherein inductive sensing coils are employed as position sensors,
   wherein N inductive coils are printed on printed circuit board (PCB) in an inductive encoder such that N modulated and phase-delayed displacement signals sensed on N inductive coils are demodulated, then N phase-delayed displacement signals are generated, wherein ZF equalization is applied to synthesize the two orthogonal displacement signals.

14. The apparatus according to claim 4, wherein capacitive sensors are used as position sensors,
   wherein N capacitive patterns are printed on printed circuit board (PCB) to act as capacitive sensors such that N modulated and phase-delayed displacement signals sensed on N capacitive patterns are demodulated, then N phase-delayed displacement signals are generated, wherein ZF equalization is applied to synthesize the two orthogonal displacement signals.

* * * * *